US 6,527,661 B2

(12) United States Patent
Leeper

(10) Patent No.: US 6,527,661 B2
(45) Date of Patent: Mar. 4, 2003

(54) LIMITED SLIP DIFFERENTIAL HAVING MAGNETORHEOLOGICAL FLUID BRAKE

(75) Inventor: Robert Leeper, Fort Wayne, IN (US)

(73) Assignee: Auburn Gear, Inc., Auburn, IN (US)

( * ) Notice: Subject to any disclaimer, the term of this patent is extended or adjusted under 35 U.S.C. 154(b) by 0 days.

(21) Appl. No.: 09/852,984

(22) Filed: May 10, 2001

(65) Prior Publication Data

US 2001/0041637 A1 Nov. 15, 2001

Related U.S. Application Data

(60) Provisional application No. 60/203,871, filed on May 12, 2000.

(51) Int. Cl.[7] .............................................. F16H 48/30
(52) U.S. Cl. ...................................................... 475/150
(58) Field of Search ......................................... 475/150

(56) References Cited

U.S. PATENT DOCUMENTS

| 4,350,913 | A | | 9/1982 | Eddens | |
|---|---|---|---|---|---|
| 5,054,593 | A | | 10/1991 | Carlson | |
| 5,090,531 | A | * | 2/1992 | Carlson | 192/21.5 |
| 5,284,330 | A | | 2/1994 | Carlson et al. | |
| 5,322,484 | A | * | 6/1994 | Reuter | 475/150 |
| 5,358,084 | A | * | 10/1994 | Schramm | 192/21.5 |
| 5,398,917 | A | | 3/1995 | Carlson et al. | |
| 5,779,013 | A | * | 7/1998 | Bansbach | 192/21.5 |
| 5,816,372 | A | | 10/1998 | Carlson et al. | |
| 5,906,767 | A | | 5/1999 | Karol et al. | |
| 5,915,513 | A | * | 6/1999 | Isley et al. | 192/35 |
| 5,947,238 | A | | 9/1999 | Jolly et al. | |
| 6,019,694 | A | | 2/2000 | Forrest et al. | |
| 6,183,386 | B1 | * | 2/2001 | Duggan | 475/84 |
| 6,334,832 | B1 | * | 1/2002 | Heravi et al. | 475/85 |

FOREIGN PATENT DOCUMENTS

| DE | 36 12 189 A | 10/1987 |
|---|---|---|
| EP | 0 436 340 A2 | 7/1991 |

\* cited by examiner

*Primary Examiner*—Dirk Wright
(74) *Attorney, Agent, or Firm*—Baker & Daniels

(57) ABSTRACT

A limited slip differential including a rotatable casing, a pair of axle shafts including respective ends, a pair of side gears rotatably fixed to the ends of the axle shafts, at least one pinion gear attached to the casing and meshingly engaged with the pair of side gears, a brake assembly defining a brake chamber and including first and second brake elements disposed within the brake chamber, the first brake element superposed with the second brake element, the first brake element rotatably fixed relative to the casing, a quantity of magnetorheological fluid disposed within the brake chamber, the first and second brake elements in contact with the magnetorheological fluid, and a selectively energized source of magnetic flux, the magnetorheological fluid being exposed to the flux when the source is energized. When the magnetorheological fluid is exposed to the magnetic flux, the magnetorheological fluid is at least partially solidified and the first and second brake elements are coupled to each other through the magnetorheological fluid.

25 Claims, 23 Drawing Sheets

FIG_3

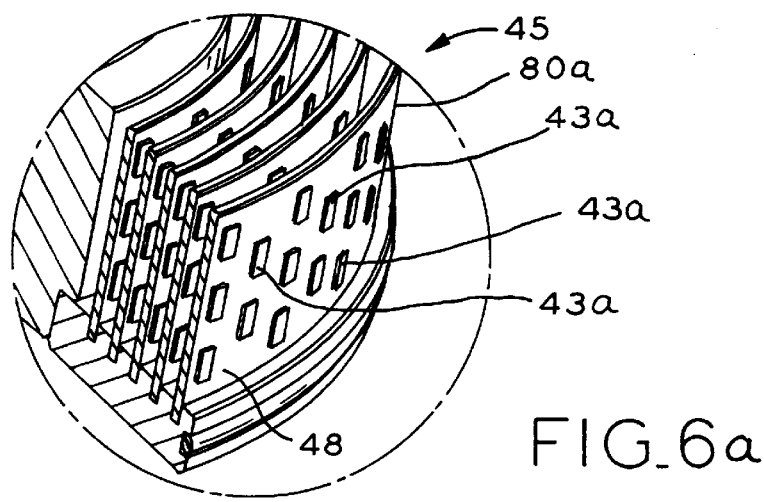
FIG_6a
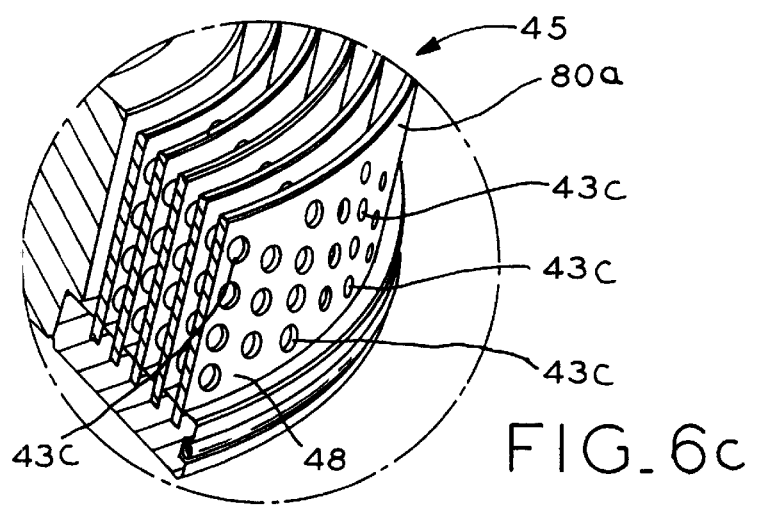
FIG_6c
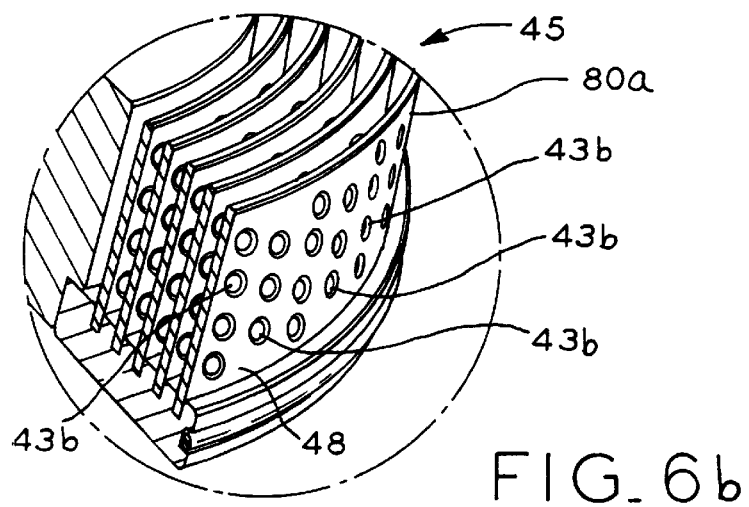
FIG_6b

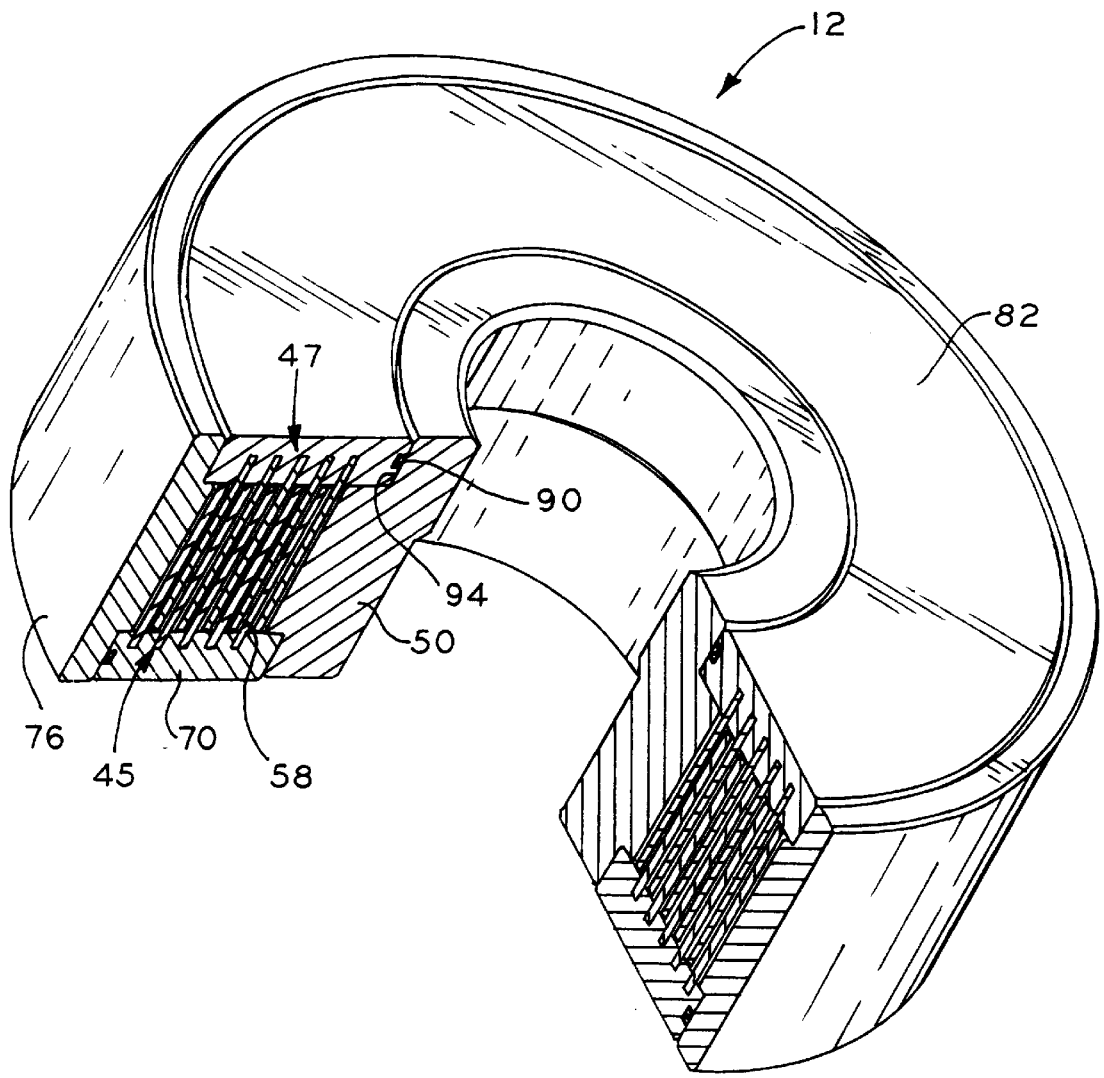
FIG_7

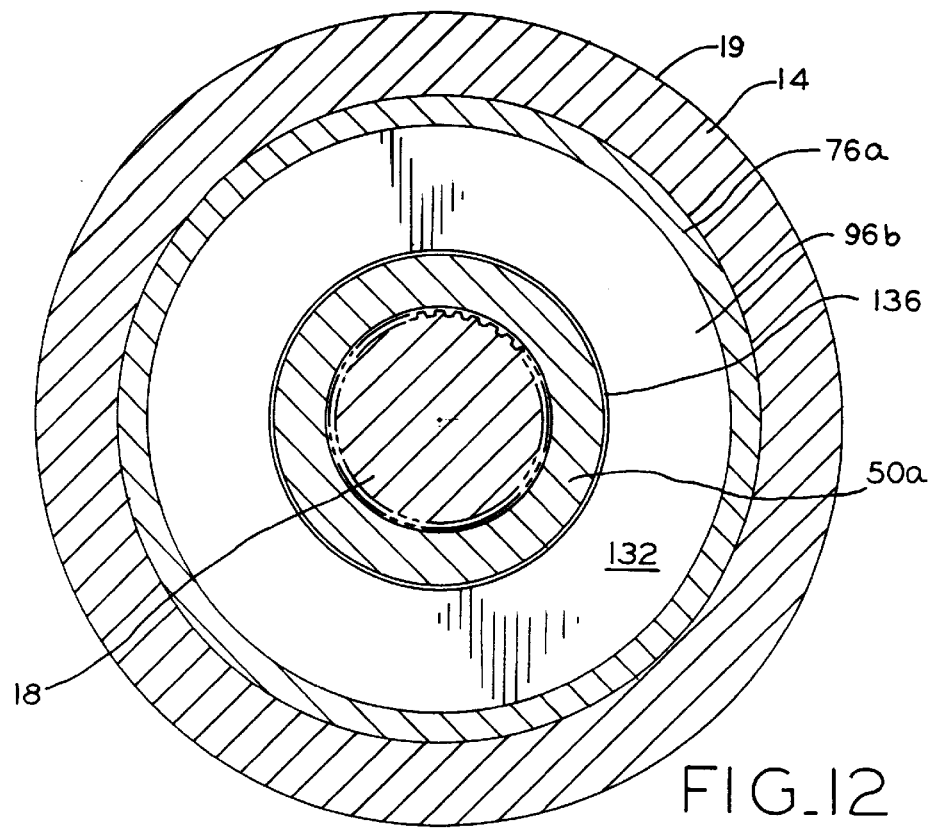
FIG_12
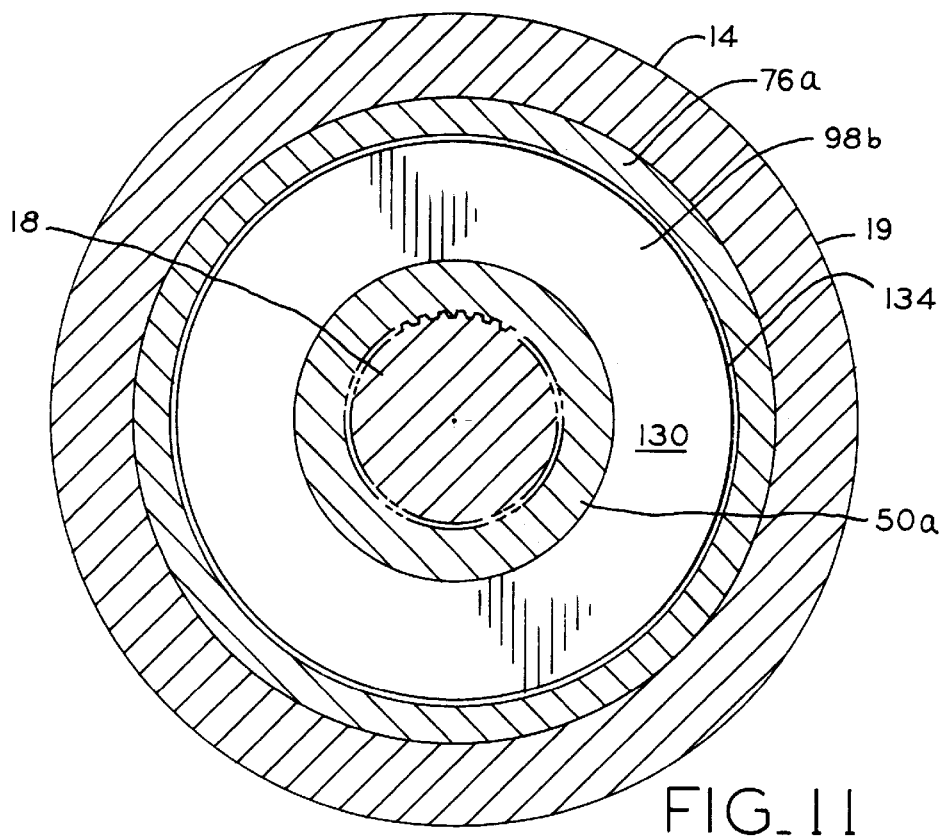
FIG_11

FIG_18

FIG_19

LIMITED SLIP DIFFERENTIAL HAVING MAGNETORHEOLOGICAL FLUID BRAKE

This application claims the benefit of 60/203,871 filed May 12, 2000.

BACKGROUND OF THE INVENTION

The present invention relates to differentials, and more particularly, to controllable, traction enhancing differentials.

Differentials are well known mechanisms and generally provide a means to transfer rotational torque, via an input shaft, i.e., a drive shaft, to a pair of output shafts, i.e., axle shafts. Conventional differential construction includes, typically, a fixed housing including a rotatable casing therein driven by the input shaft through a ring gear attached about the casing. The casing rotatably supports each output shaft which typically includes a side gear fixed thereto and positioned within the casing. The side gears intermesh with pinion gears which rotate about a pin fixed relative to the casing. Differentials are often utilized in conventional vehicle applications where the differential engages a pair of wheels which respectively mount to each output shaft to maintain traction with the road while the vehicle is turning. The differential essentially distributes torque, provided by the input shaft, to the output shafts. One type of differential, termed an "open" differential, includes a construction which distributes torque to the output shafts without implementing means to compensate for loss of traction. The open differential is unsuitable in slippery conditions where one wheel experiences a much lower coefficient of friction than the other wheel; for instance, when one wheel of the vehicle is located on a patch of ice and the other wheel is on dry pavement. The wheel experiencing the lower coefficient of friction loses traction and a small amount of torque to that wheel will cause a "spin out" of that wheel. Since the maximum amount of torque which can be exerted on the wheel with traction is equal to torque on the wheel without traction, i.e., the slipping wheel, the engine is unable to develop any torque and the wheel with traction is unable to rotate. A number of methods have been developed to limit wheel slippage under such conditions.

Prior methods of limiting slippage between the side gears and the differential casing use a frictional clutch mechanism, either clutch plates or a frustoconical engagement structure, and a bias mechanism, usually a spring, to apply an initial preload between the side gears and the differential casing. By using a frictional clutch with an initial preload, for example a spring, a minimum amount of torque can always be applied to the wheel having traction, i.e. the wheel located on dry pavement. The initial torque generates gear separating forces which further act on the frictional clutch and develop additional torque. Examples of such limited slip differentials are disclosed in U.S. Pat. No. 4,612,825 (Engle), U.S. Pat. No. 5,226,861 (Engle) and U.S. Pat. No. 5,556,344 (Fox), which are assigned to the assignee of the present invention. The disclosures of these patents are each expressly incorporated herein by reference.

In a differential, the development of torque will create side gear separating forces which tend to move the side gears away from the pinion gears. In general, gear separating forces are forces induced on any set of meshing gears by the application of torque to the gears. Differentials were adapted to provide an initial preload to utilize side gear separating forces for further braking action between the side gears and the differential casing. In operation, when one wheel is in contact with a slippery surface, the initial preload creates contact and frictional engagement between the differential casing and a clutch mechanism. The clutch mechanism is disposed between the side gears and the differential casing to distribute engine torque to the wheel having traction. The torque transfer induces gear separating forces on the side gears tending to separate the side gears and further frictionally engage the clutch mechanism with the casing. The increased frictional engagement of the clutch allows more torque to be distributed between the side gears and the differential casing to effectively transfer torque to the wheel with traction. However, the clutches of such preloaded differentials are usually always engaged, and thus are susceptible to wear, causing undesirable repair and replacement costs. Additionally, such clutch mechanisms usually employ spring mechanisms which add to the cost and difficulty of manufacture.

An additional problem associated with preloaded clutch mechanisms are that they lock the output shafts together in situations where differential rotation between axle shafts is necessary. For example, if the vehicle is making a turn when the wheels are sufficiently engaged on the road surface and a sufficient amount of torque is developed, the differential will tend to lock up the output shafts due to the action of the side gear separating forces. This may occur, for example, during turns on surfaces with a high coefficient of friction while under acceleration. In such a case, even though differential rotation is required, the two output shafts lock up causing one wheel to drag and slide along the road surface. This problem is evident in rear drive vehicles during turns under acceleration as the portion of the vehicle near the dragging wheel may tend to bounce up and down.

Another method of limiting slippage involves engaging a frictional clutch mechanism between the side gears and the differential casing based on the difference in rotational speeds between the two output shafts. Limited slip differentials employing this method are classified as speed-sensitive differentials. The frictional clutch may be actuated by various hydraulic pump mechanisms which may be external to the differential casing or may be constructed of elements disposed inside the differential casing. However, such mechanisms usually are complicated and also add to the cost and difficulty of manufacture. Further, speed sensitive differentials are "reactive", i.e., they react after a wheel has already lost traction.

Another known method of limiting slippage involves using a flyweight governor in combination with a clutch mechanism. The governor actuates the clutch mechanism when a predetermined differential rotation rate is detected. However, devices heretofore using such arrangements are configured such that the governor almost instantaneously applies extremely high clutch torque to the output shafts, which often leads to lock-up of the two output shafts. Distributing torque in such a manner applies very high stresses on the output shafts which may result in fracturing the output shafts.

In addition to actuating a clutch mechanism using mechanical or hydraulic arrangements, response and performance characteristics may be improved by controlling the actuation of a limited slip differential using electronic control methods. An example of such an electronically controlled differential is disclosed in U.S. Pat. No. 5,989,147 (Forrest), assigned to the assignee of the present invention, the disclosure of which is expressly incorporated herein by reference. Electronic control methods provide the advantage of accurate, reliable control within a narrow control band. Electronic control methods also allow operating parameters to be easily changed, for example by programming the electronic control systems to respond to a particular range of differentiation speeds or some other vehicle parameter such as throttle position.

The electronically controllable differential provides a clutch mechanism which transfers torque between a differential casing and a side gear in response to the application of an initiating force by an electronic actuator. The clutch mechanism, for example, may comprise a cone clutch element engageable with an insert disposed between the side gear and the rotatable casing. The clutch is engageable with the casing through camming portions provided between the side gear and clutch element. Alternatively, the camming portions may be substituted with a ball ramp assembly. The ball ramp assembly provides axial displacement of the clutch element when an initiating force is applied by the electronic actuator.

The electronic control system which actuates the differential typically includes the electronic actuator, sensors, which sense a predetermined rotational condition of the side gear, and an electromagnet which issues an electromagnetic field for applying the initiating force. The electromagnet is arranged to generate a generally toroidal magnetic flux path encircling the electromagnet to magnetically force the clutch into engagement with the casing.

In operation, specifically during non-slipping conditions, the electronically controllable differential operates as an open differential with the clutch disengaged from the housing. In slipping conditions, for example, a predetermined rotational condition of the differential components is sensed, the electronic control system actuates the electromagnet to issue a magnetic field which applies an initiating force to the clutch. The initiating force produces an initial axial movement of the clutch such that the clutch, through frictional engagement, momentarily slows down with respect to the side gear. The momentary slowdown further effectuates torque transfer through axial displacement of the side gear to provide a predetermined amount of torque from the rotatable casing to the side gear. Both ball and ramp arrangements and interacting cam portion type differentials are equally adaptable to electronically controllable differentials.

Although utilizing an electromagnet to induce frictional force between the clutch and the differential casing provides an increased level of controllability over a limited slip differential, and ultimately, a more precise accountability of torque to each output shaft, there are certain disadvantages inherent in such a design. One such disadvantage includes the increased mechanical hysteresis associated with frictional component clutches. Increased hysteresis is a consequence of the significant force requirement associated with separating and engaging the clutch element. These force requirements may be unpredictable due to several factors which include: heating of engaged surfaces, part wear and clutch seizure. Thus, a limited slip differential having improved mechanical hysteresis would be highly desirable. Further, another disadvantage of frictional clutch type differentials is the diminished controllability depending on wear of the torque transferring components. A further disadvantage includes the complexity required to machine the frustoconical, frictional engaging components which adds significant manufacturing cost to the differential.

Mechanisms used heretofore, in association with exercise equipment and engine mount applications, include magnetorheological (MR) fluid mechanisms replacing traditionally used dampers, shock absorbers and resistance elements, i.e., springs. For example, the MR fluid damper is constructed of a housing reciprocally supporting a plunger submersed in the MR fluid. In operation, a magnetic field is introduced to the MR fluid within the housing to transform or solidify the fluid which effectuates a resistance on the plunger and a desirable damping effect is experienced.

The MR fluid includes magnetic particles dispersed or suspended in a carrier fluid. The carrier fluid typically has a viscosity similar to that of engine oil. In the presence of a magnetic field, however, the magnetic particles become polarized and are thereby organized into chains of particles within the carrier fluid. The chains of particles effectuate an increase in the viscosity or flow resistance of the fluid resulting in the development of a substantially solid mass, the viscosity thereof similar to that of a Bingham solid. Bingham solids have a zero rate of flow in the presence of a shear producing a stress in the material less than the material's yield strength and a linear rate of flow when the shear produces a stress above the material's yield strength. The Bingham solid returns to liquid when the magnetic field is removed due to the particles returning to an unorganized and suspended state within the carrier fluid.

It is desirable to enhance controllability of the torque transfer between axle shafts and the housing of an electrically controllable differential. Furthermore, it is desirable to decrease, in a limited slip differential, the number of friction wearing components otherwise requiring costly maintenance or replacement.

SUMMARY OF THE INVENTION

The present invention provides a limited slip differential including a rotating casing, first and second side gears disposed within the casing, at least one pinion gear disposed within the casing and engaged with the first and second side gears, the pinion gear rotatably attached to the casing, a quantity of MR fluid provided between the first side gear and the casing, and a magnet from which a magnetic field is issued, the MR fluid being selectively exposed to the magnetic field. The first side gear and the casing are rotatably coupled through the MR fluid when the MR fluid is exposed to the magnetic field, whereby relative rotation between the first and second side gears is controlled.

The present invention also provides a limited slip differential including a rotating casing, at least one pinion gear rotatably attached to the casing, and first and second axles extending into the casing, the axles being engaged with, and rotatable relative to, each other and to the casing. At least one axle is also rotatably coupled to rotating casing, whereby that axle is driven by the casing. Means are also provided for selectively increasing the viscosity of a magnetic fluid in operative engagement with an axle and the casing, and rotatably coupling both axles to the casing in response to the viscosity increase, whereby both axles are driven by the casing.

The present invention further provides method for operating a limited slip differential, including rotating a first axle relative to a rotating casing and a second axle, applying a magnetic field to an MR fluid, whereby the viscosity of the MR fluid is increased, and rotatably coupling at least one of the first and second axles to the rotating casing through the increased viscosity MR fluid, whereby the relative rotation is slowed.

The present invention also provides a limited slip differential including a rotatable casing, a pair of axle shafts including respective ends, a pair of side gears rotatably fixed to the ends of the axle shafts, at least one pinion gear attached to the casing and meshingly engaged with the pair of side gears, a brake assembly defining a brake chamber and including first and second brake elements disposed within the brake chamber, the first brake element superposed with the second brake element, the first brake element rotatably fixed relative to the casing, a quantity of magnetorheological fluid disposed within the brake chamber, the first and second brake elements in contact with the magnetorheological fluid, and a selectively energized source of magnetic flux, the magnetorheological fluid being exposed to the flux when the source is energized. When the magnetorheological fluid is exposed to the magnetic flux, the magnetorheological fluid is at least partially solidified and the first and second brake elements are coupled to each other through the magnetorheological fluid.

Notably, the magnetic flux may be variable. Further, in some embodiments, the differential may include a clutch which is rotatably fixed relative to one of the axle shafts and releaseably operatively engaged with the casing, and means for engaging the clutch in response to relative rotation between portions of the brake assembly and the other axle shaft.

The differential of the present invention decreases the mechanical hysteresis associated with utilizing frictional clutch assemblies to transfer torque between a casing and an axle shaft, as in prior limited slip differentials. The present invention, by decreasing mechanical hysteresis, decreases the time of control response of the differential.

Another advantage of the present invention is that wear and fatigue, inherent in frictional torque transferring components of prior limited slip differentials, is significantly decreased due to the decrease in the number of frictional torque transferring members required.

A further advantage of the present invention is a decrease in number of frictionally engaging clutch components vis-a-vis prior limited slip differentials. The components are complex to manufacture, and the reduction in their number represents significant manufacturing cost savings.

BRIEF DESCRIPTION OF THE DRAWINGS

The above mentioned and other features and objects of this invention, will become more apparent and the invention itself will be better understood by reference to the following description of the embodiments of the invention taken in conjunction with the accompanying drawings, wherein:

FIG. 6a is an enlarged view of the encircled portion of FIG. 6, showing a first embodiment surface characteristic of the cylindrical brake elements;

FIG. 6b is an enlarged view of the encircled portion of FIG. 6, showing a second embodiment surface characteristic of the cylindrical brake elements;

FIG. 6c is an enlarged view of the encircled portion of FIG. 6, showing a third embodiment surface characteristic of the cylindrical brake elements;

FIG. 7 is a sectional view of the brake assembly of FIG. 4;

FIG. 11 is a sectional view of the differential of FIG. 9 along line 11—11, showing one of the disk elements fastened to the axle shaft;

FIG. 12 is a sectional view of the differential of FIG. 9 along line 12—12, showing another one of the disk elements fastened to the housing and opposing the disk element shown in FIG. 11;

Figure 1:
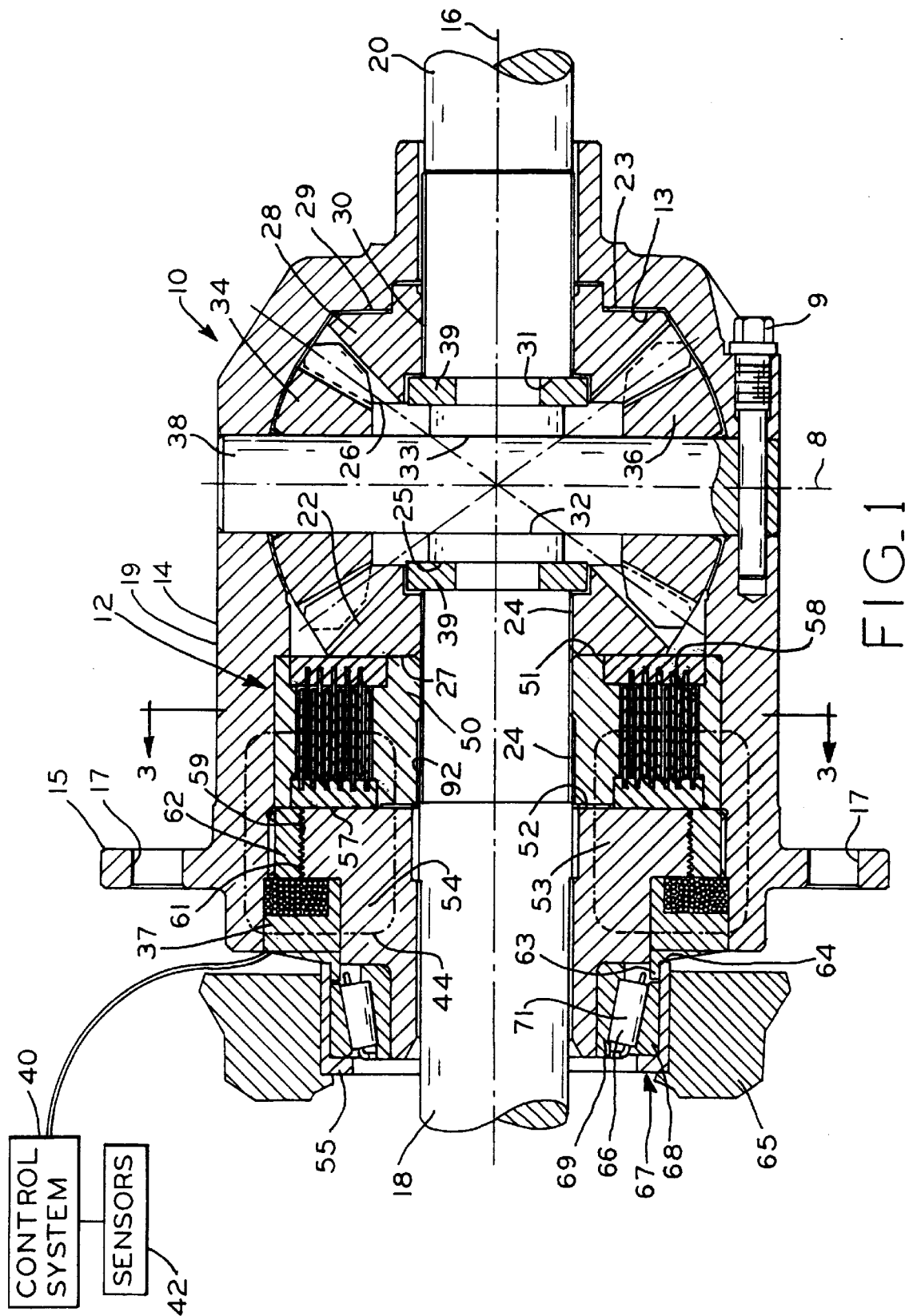
FIG. 1 is a sectional view of a first embodiment of a controllable differential according to the present invention.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate particular embodiments of the invention such exemplifications are not to be construed as limiting the scope of the invention in any manner.

DETAILED DESCRIPTION OF THE INVENTION

FIG. 1 shows limited slip differential 10, a first embodiment of a differential assembly according to the present invention. Differential 10 includes ferrous rotatable casing 14 which rotates about axis 16 and includes inner cavity 13 and exterior surface 19. First and second axle shafts 18, 20, respectively extend outwardly from casing 14 and are aligned with each other along axis 16. Flange 15 is integral with external surface 19 of casing 14 and extends radially outward therefrom. As is customary, a driving ring gear (not shown) mounts to flange 15 and threaded fasteners (not shown) extend through flange holes 17 to fasten the driving ring gear to the flange. The driving ring gear is typically coupled to a drive shaft assembly (not shown) driven by a power source (not shown) such as, for example, an internal combustion engine. First side gear 22 is splined to first axle shaft 18 through splined connection 24 and second side gear 28 is splined to second axle shaft 20 through splined connection 30. First and second side gears 22, 28, respectively mesh with a pair of pinion gears 34, 36 each of which are rotatably supported on elongate cross pin 38. Cross pin 38 extends in a direction perpendicular to axis 16, and is retained within casing 14 by bolt 9.

First axle shaft 18 is prevented from axial separation from casing 14 by C-lock 39 which is positioned in groove 25 of first axle shaft 18 and abuts side gear 22. First axle shaft 18 is restrained from relative axial inward movement, toward axle shaft 20, by its axial end 32 abutting cross pin 38. Second axle shaft 20 is prevented from axial separation from casing 14 by C-lock 39 which is positioned in groove 31 of second axle shaft 20 and abuts side gear 28. Second axle shaft 20 is restrained from inward axial movement, toward axle shaft 18, by its axial end 33 abutting cross pin 38. First side gear 22 includes an axial face 27 which is abuttingly engaged with axial end 51 of brake assembly output hub 50 to prevent axial movement toward flange 15. Inward axial movement of first side gear 22 is limited by its intermeshed engagement with pinion gears 34 and 36. Inward axial movement of second side gear 28 is limited by its intermeshed engagement with pinion gears 34 and 36. Axial end surface 29 of second side gear 28 is engaged with casing 14 through bearing 23. Bearing 23 may be a thrust bearing, a solid brass washer or another suitable force bearing member which provides an interface between casing 14 and rotatable second side gear 28.

Figure 2:
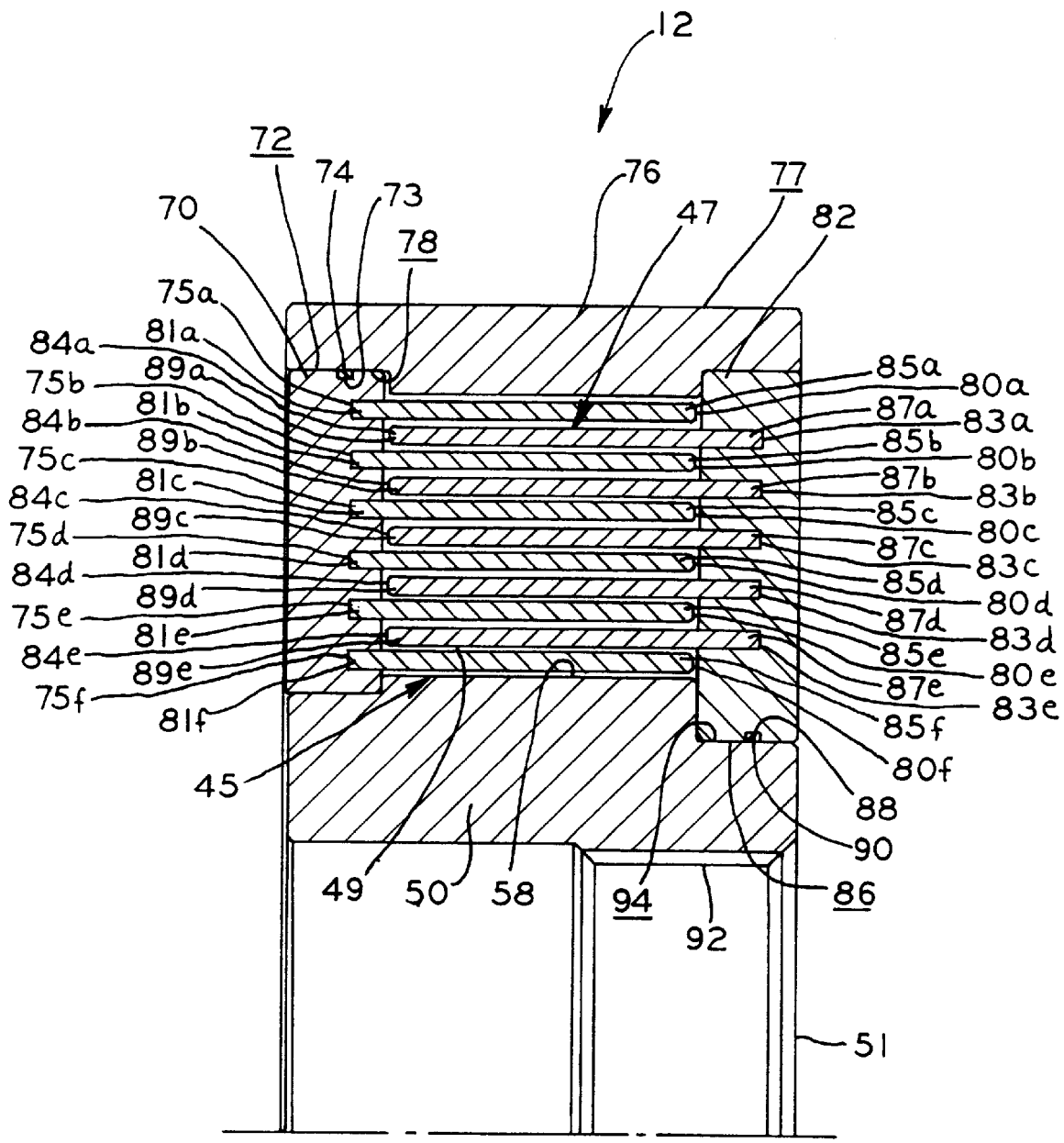
FIG. 2 is an enlarged, partial sectional view of the brake assembly of the differential of FIG. 1, showing the cylindrical brake elements of the magnetorheological fluid brake assembly.
Figure 3:
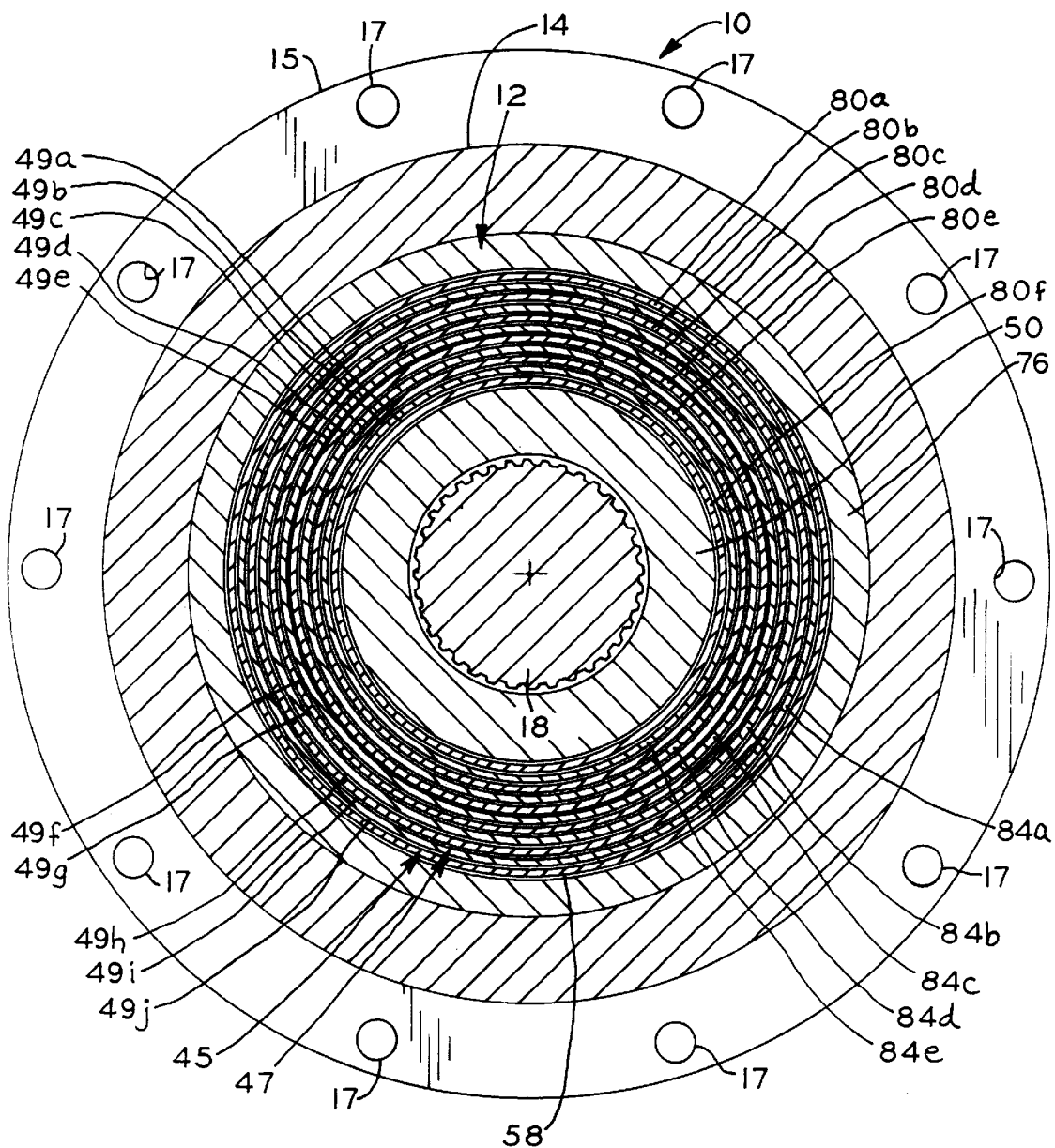
FIG. 3 is a sectional view of the differential of FIG. 1 along line 3—3, showing the coaxially arranged and overlaying sets of cylindrical elements.
Figure 4:
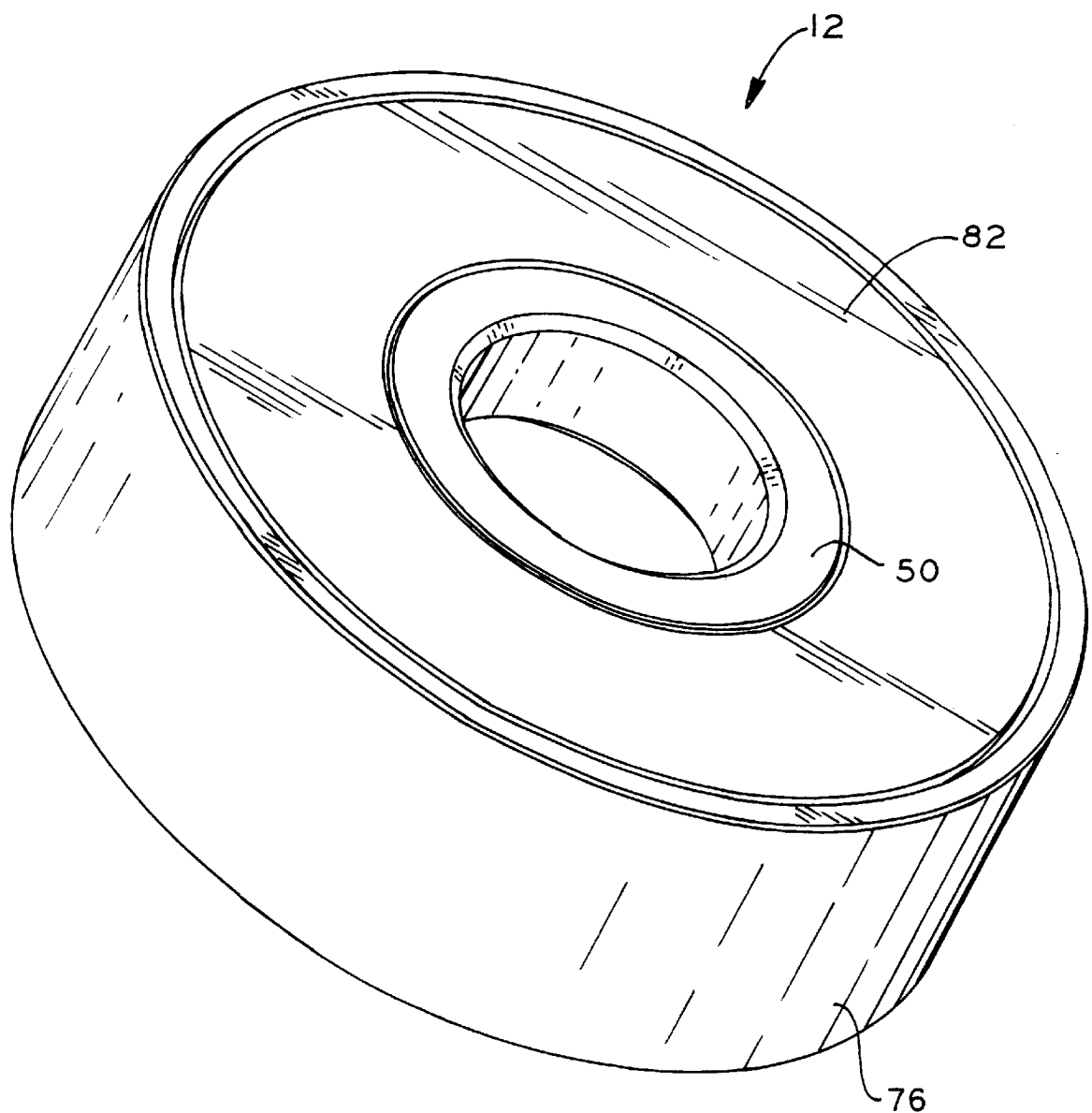
FIG. 4 is a perspective view of the brake assembly of the differential of FIG. 1.
Figure 5:
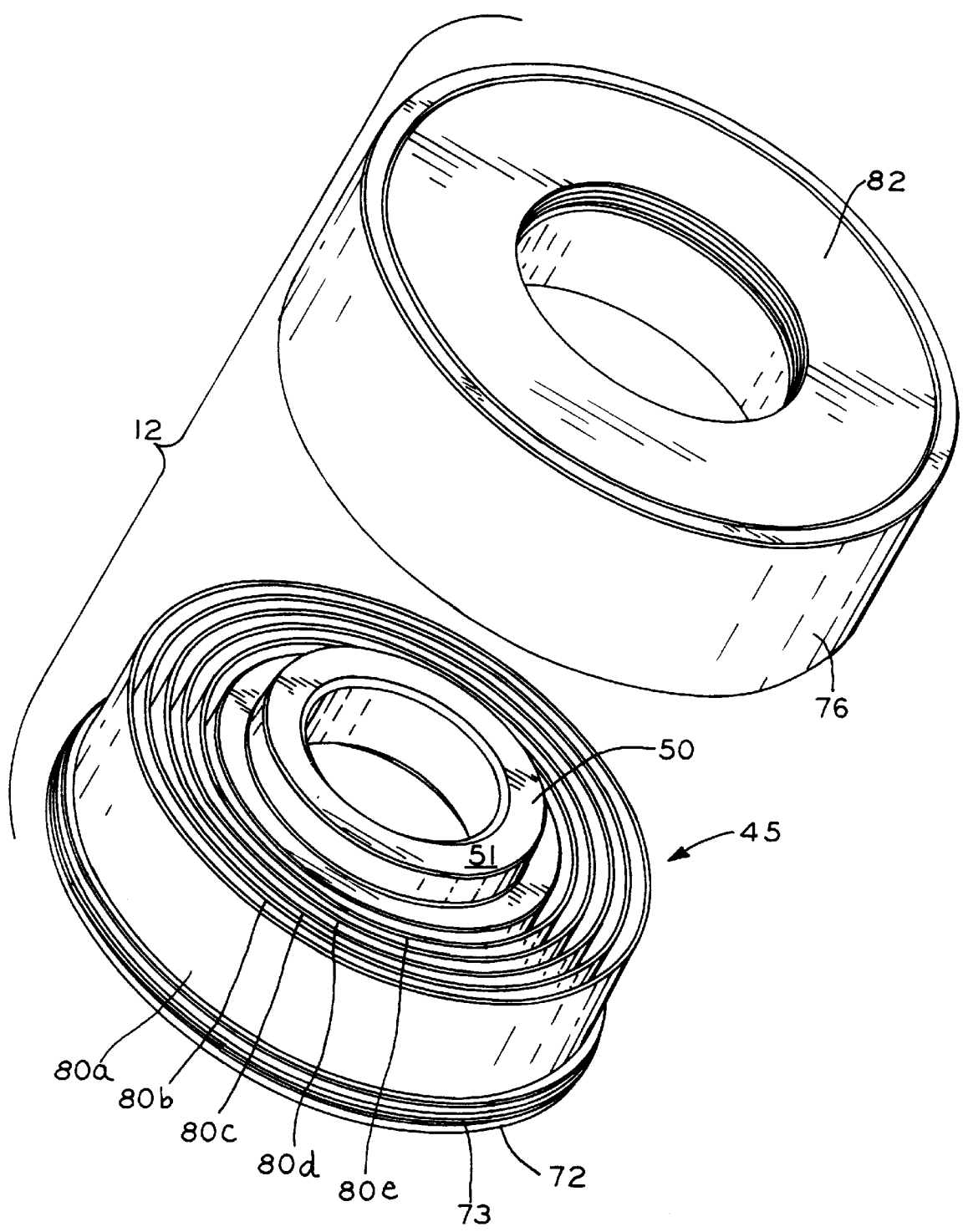
FIG. 5 is an exploded view of the brake assembly of FIG. 4, showing a set of its cylindrical brake elements.

Annular brake assembly 12 (FIG. 4) is disposed within cavity 13 of casing 14 and, as best shown in FIGS. 1–3 and 6–8, includes a nested arrangement of cylindrical elements confined within annular brake chamber 58. First set of cylindrical brake elements 45, fixed relative to shaft 18, superpose second set of brake elements 47 fixed relative to casing 14 (FIG. 3). First and second sets of brake elements 45, 47 are positioned coaxially about axis 16 and are arranged to establish successive and generally uniform-width gaps 49a–49j (FIGS. 3, 7 and 8) between adjacent elements of first brake element set 45 and second brake element set 47. Brake assembly 12 sealably encloses annular brake chamber 58 and is disposed within cavity 13 of casing 14. Brake chamber 58 forms an annulus having a generally rectangular axial cross section (FIGS. 2, 7 and 8) and its walls are comprised of output hub 50, annular insert 76 and first and second backing plates 70 and 82, respectively. Output hub 50 has an annular structure and is splined to first axle shaft 18 (FIG. 1); its axial end 51 abuts first side gear 22. Annular first backing plate 70 is fixed to output hub 50 by, for example, a press or shrink fit, and includes outer peripheral surface 72 which includes groove 73, occupied by O-ring 74 (FIGS. 2 and 6–8). First backing plate 70 is thus fixed relative to first axle shaft 18 through output hub 50.

Annular insert 76 includes outer periphery 77 which is fixedly engaged with a cylindrical surface portion of cavity 13 by, for example, a press or shrink fit, thereby securing insert 76 to rotatable casing 14. Inner surface 78 of annular insert 76 provides a sealing surface for O-ring 74, thus, when first backing plate 70 and output hub 50 rotate independently of insert 76 within casing 14, a dynamic seal is formed between first backing plate 70 and annular insert 76 to fluidly seal brake chamber 58. Second backing plate 82 is fixed to annular insert 76 by, for example, a press or shrink fit. Second backing plate 82 is thus fixed relative to casing 14 through annular insert 76. Annular insert 76 and second backing plate 82 are rigidly fastened together and rotate with casing 14 about axis 16 (FIG. 1).

Figure 6:
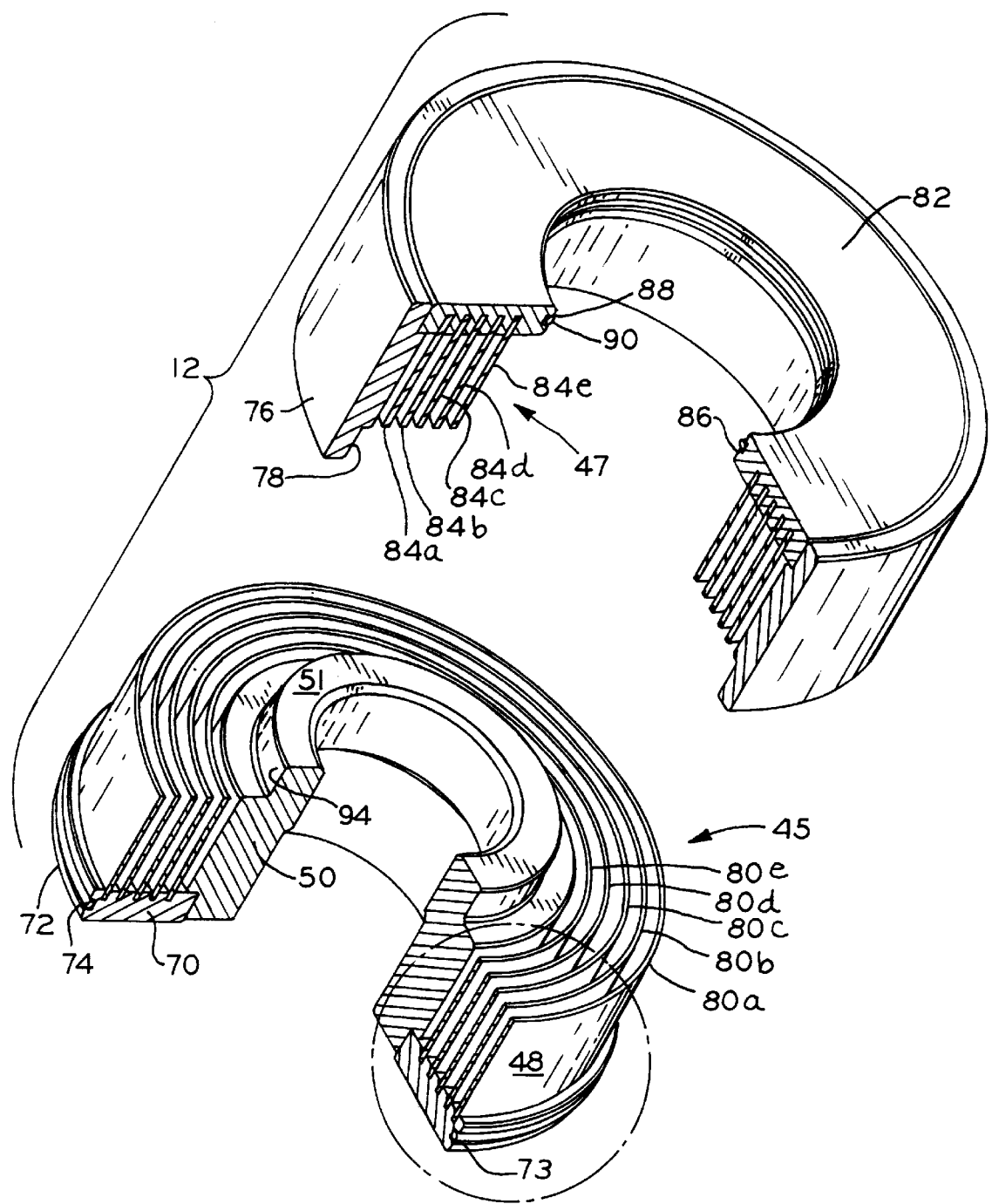
FIG. 6 is a sectional view of the brake assembly of FIG. 5, showing both sets of cylindrical brake elements.
Figure 8:
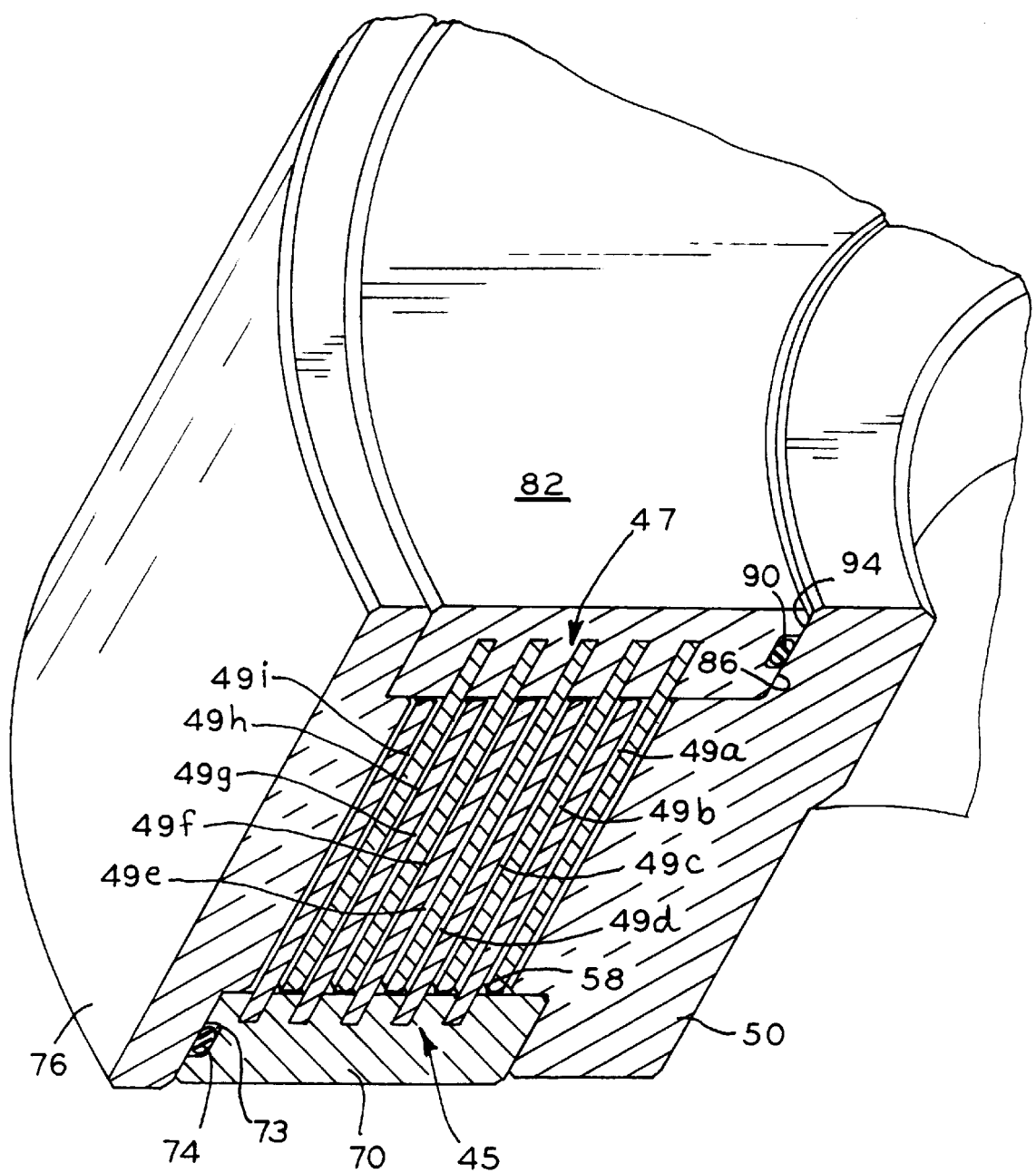
FIG. 8 is an enlarged view of the brake assembly of FIG. 7.

Splined inner surface 92 of output hub 50 engages spline portion 24 of first axle shaft 18 (FIG. 1) to connect first axle shaft 18 to output hub 50. Second backing plate 82 includes inner cylindrical surface 86 having groove 88 occupied by O-ring 90. O-ring 90 in sliding contact with cylindrical surface 94 of output hub 50 to provide a dynamic seal between second backing plate 82 and output hub 50 (FIGS. 6–8). O-rings 74 and 90 may be constructed of an elastomeric material such as, for example, Buna-N or Viton™.

Referring to FIGS. 2, 7 and 8, first set of brake elements 45 includes coaxially arranged cylindrical elements 80a–80f which include first ends 81a–81f fixed within grooves 75a–75f of first backing plate 70. Elements 80a–80f are respectively fixed within grooves 75a–75f provided in first backing plate 70 by a press fit or other suitable joining means. Cylindrical elements 80a–80f extend axially away from first backing plate 70, and a clearance is provided between their respective second ends 85a–85f and second backing plate 82. Second backing plate 82, fixed to casing 14 (FIG. 1) through annular insert 76, includes second set of brake elements 47 fastened thereto and interleaved with first set of brake elements 45. Second set of elements 47 includes coaxially arranged cylindrical elements 84a–84e which include first ends 87a–87e respectively fixed within grooves 83a–83e formed in backing plate 82. Cylindrical brake elements 84a–84e extend axially away from second backing plate 82, and a clearance is provided between their respective second ends 89a–89e and first backing plate 70. Cylindrical elements 80a–80f coaxially overlay and are interleaved with cylindrical elements 84a–84e such that each cylindrical element 80 is between and immediately adjacent a pair of cylindrical elements 84. Elements 80 and 84 are separated by uniform-width cylindrical gaps 49a–49j (FIG. 8).

A magnetorheological (MR) fluid, captured within brake chamber 58, contacts brake element sets 45, 47 and is generally provided within gaps 49a–49j between brake element sets 45 and 47 (FIGS. 3, 7 and 8). The MR fluid possesses the characteristic of increasing in viscosity when exposed to a magnetic field. MR fluid is in a substantially liquid state when an insignificant or no magnetic field is imposed on it. Magnetic particles are randomly dispersed and suspended within a carrier fluid in the liquid state. The carrier fluid has a viscosity similar to that of motor oil. However, in the presence of a magnetic field, the MR fluid is transformed into that of a Bingham solid, undergoing a viscosity change or rheological transformation. The viscosity change is attributable to the magnetic particles responding by migrating toward the magnetic field to form chains. A magnetic field which forms numerous closely arranged chains transforms the MR fluid into a substantially solid substance. The degree of solidification of the MR fluid is directly proportional to the flux density of the magnetic field 44 (FIG. 1) issued by the electromagnet. By controlling the magnitude and direction of current through coil 37, suitable solidification of the MR fluid may be achieved which supports a shear load between the first and second sets of brake elements 45 and 47. As the degree of solidification of the MR fluid increases, relative rotation between brake elements 45 and 47 decreases and torque is transferred from casing 14 to axle shaft 18. Pinion gears 34 and 36 and side gears 28 and 22 transfer loads between axles 18 and 20, and thus torque can be transmitted to whichever wheel has traction.

As best seen in FIG. 1, when electrically energized, coil 37 generates toroidal magnetic flux 44 which extends radially, relative to axis 16, through first and second sets of brake elements 45, 47, forming radially oriented magnetic particle chains within the MR fluid. A magnetic field directed radially through brake elements 45 and 47 provides a generally uniform shear load support of the solidified MR fluid respective of the adjacent surfaces of alternating brake elements 45, 47. Each gap 49a–49j is defined by a radially inner and outer cylindrical surface provided on alternating sets of brake elements 45, 47. The surfaces of brake elements 45, 47, illustrated by cylindrical element 80a in FIG. 6, may constitute a substantially smooth surface 48. Alternatively, one or both of a pair of interfacing brake element surfaces 48 may include raised portions 43a shown in FIG. 6a, indentations 43b shown in FIG. 6b, or holes 43c shown in FIG. 6b to promote increased shear load support of the solidifying MR fluid. Further, a combination of the aforesaid brake element surfaces illustrated in FIGS. 6, 6a, 6b and 6c may provide increased shear load support of the solidifying MR fluid between interfacing brake elements.

Cylindrical elements 80a–80f and 84a–84e are constructed from a low carbon steel or other suitable magnetically soft material which conducts the magnetic flux to create a continuous flux path across the MR fluid to solidify the same. Output hub 50 and annular insert 76 are also manufactured from a low carbon steel to suitably direct magnetic flux 44 radially through cylindrical first and second sets of brake elements 45, 47 as shown in FIG. 1. First and second backing plates 70, 82 are made from a non-magnetic material such as, for example, 300 series stainless steel or aluminum to direct magnetic flux 44 radially to penetrate the MR fluid and the cylindrical sets of braking elements 45, 47. The MR fluid is introduced into annular chamber 58 through a capped fill hole (not shown) preferably provided in either first or second backing plate 70, 82 respectively.

In operation, limited slip differential 10 operates as an open differential when brake assembly 12 is deactivated, i.e., coil 37 not creating a magnetic flux. Control system 40 serves to provide a variable level of current to coil 37, and in turn, coil 37 varies the amount of magnetic flux 44 created within brake assembly 12 to solidify the MR fluid. Control system 40 is electrically connected to sensors 42, which may comprise axle speed sensors sensing axle shaft speed or onboard accelerometers which sense axle acceleration. Alternatively, any other conventionally used sensors which provide information correlating to engine or vehicle status may be utilized. Control system 40 processes electrical information received from the sensors and accordingly adjusts the current to coil 37. Magnetic flux 44 induced by coil 37 effectuates a degree of solidification within the MR fluid and a corresponding transfer of torque between respective first and second sets of elements 45 and 47.

Referring to FIG. 1, ferrous end cap 54 includes threaded periphery 59 engaged with a threaded portion of casing 14. End cap 54 is constructed by, for example, a sintered powder metal process, to provide a peripheral isolation ring 62 made of a non-magnetic material, as described in U.S. Pat. No. 6,019,694 (Forrest et al.), to help direct magnetic flux 44 through elements 45, 47 as shown in FIG. 1. Coil 37 is fixedly engaged to bearing spacer 55 through, for example, a press-fitting of collar portion 63 of coil 37 to open end 64 of bearing spacer 55. The mounting of coil 37 upon axle housing 65 is the subject of pending U.S. patent application Ser. No. 09/484,967, filed Jan. 18, 2000, and assigned to the assignee of the present invention, the disclosure of which is expressly incorporated herein by reference. Coil 37 is mounted to axle housing 65 by being press-fitted into bearing spacer 55, and in turn, bearing spacer is press-fitted into axle housing 65.

Bearing assembly 67 fits within an annular space formed between end cap 54 and bearing spacer 55 to provide rotatable support of end cap 54 through bearing spacer 55. Bearing assembly 67 comprises cup portion 68, cone portion 69 and a plurality of cylindrical rollers 71. Cone portion 69 is attached to end cap 54 and cup portion 68 is attached to bearing spacer 55 by a press fit. Cone portion 69 is engaged with, and rotates respective of cup portion 68 through the plurality of rollers 71.

As best seen in FIG. 3, cylindrical elements 80a–80f, are rigidly connected to first axle shaft 18 through first backing plate 70. In the presence of magnetic flux 44 (FIG. 1), MR fluid within gaps 49a–49j substantially transforms, depending on the degree of solidification the fluid may become a Bingham solid, effectively binding cylindrical elements 84a–84e to cylindrical elements 80a –80f. Torque is transferred from casing 14 to axle shaft 18 through the solidified MR fluid. When a significant difference in speed, for example, is sensed between axle shafts 18 and 20 by sensors 42, controller 40 responds by activating coil 37 to create flux 44. MR fluid solidifies, and at least partially binds elements 84a–84e with elements 80a–80f, transferring torque from casing 14 to first axle shaft 18.

Figure 9:
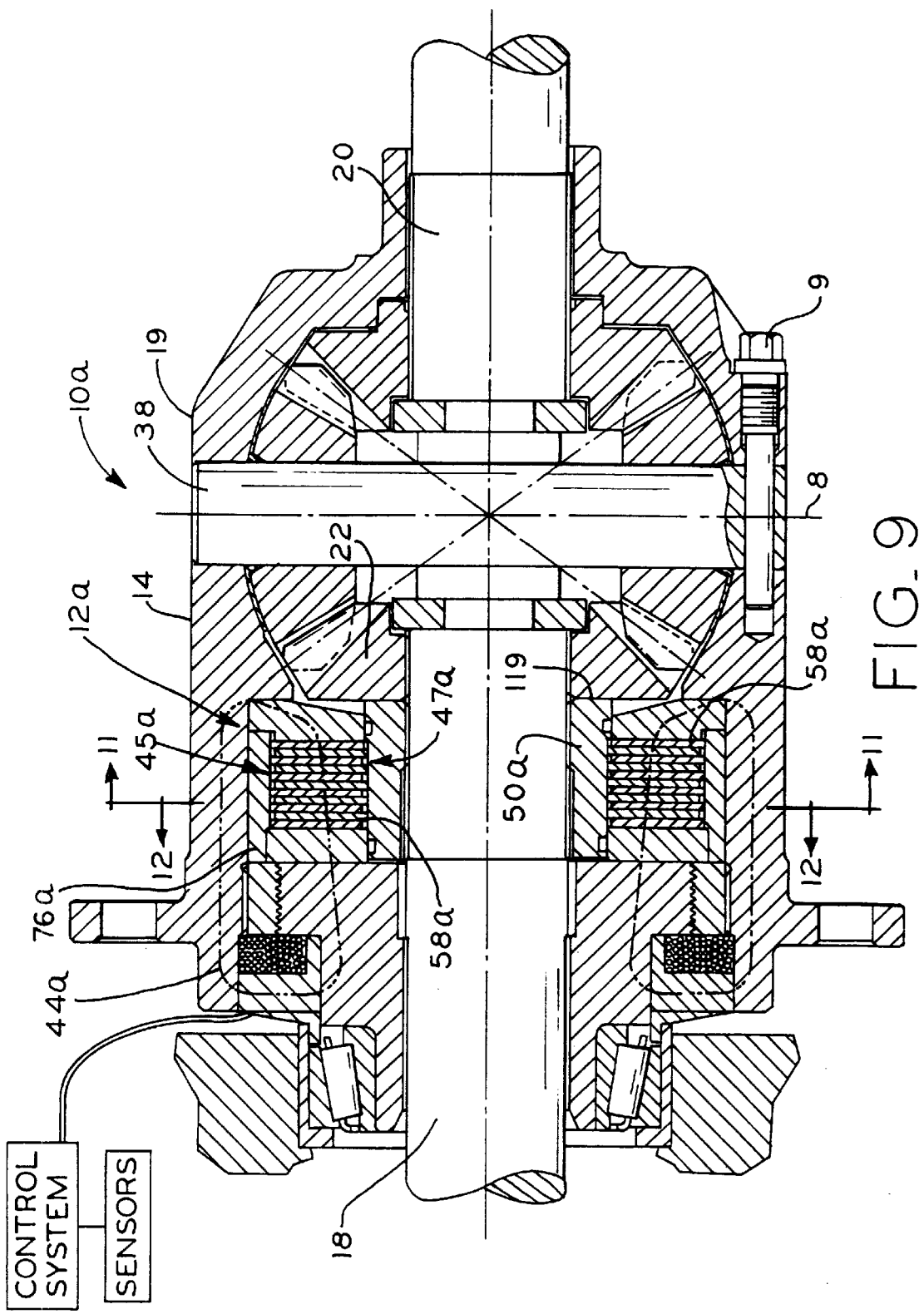
FIG. 9 is a sectional view of a second embodiment of a controllable differential according to the present invention.

FIG. 9 shows a second embodiment of the invention. MR fluid differential 10a differs from first embodiment differential 10, shown in FIG. 1, in several aspects. One such aspect includes modified brake assembly 12a which includes disk-shaped, annular brake elements. Brake assembly 12a includes first set of brake elements 45a comprised of a plurality of disks 96a–96f fixed respective of casing 14 and superposed second set of brake elements 47a. Second set of brake elements 47a includes a plurality of disks 98a–98e fixed to output hub 50a. Disks 96a–96f and 98a–98e at least contact the MR fluid and in the exemplary embodiment gaps 100a–100j are formed between alternating disks, each of these gaps is substantially occupied by a quantity of MR fluid.

Figure 10:
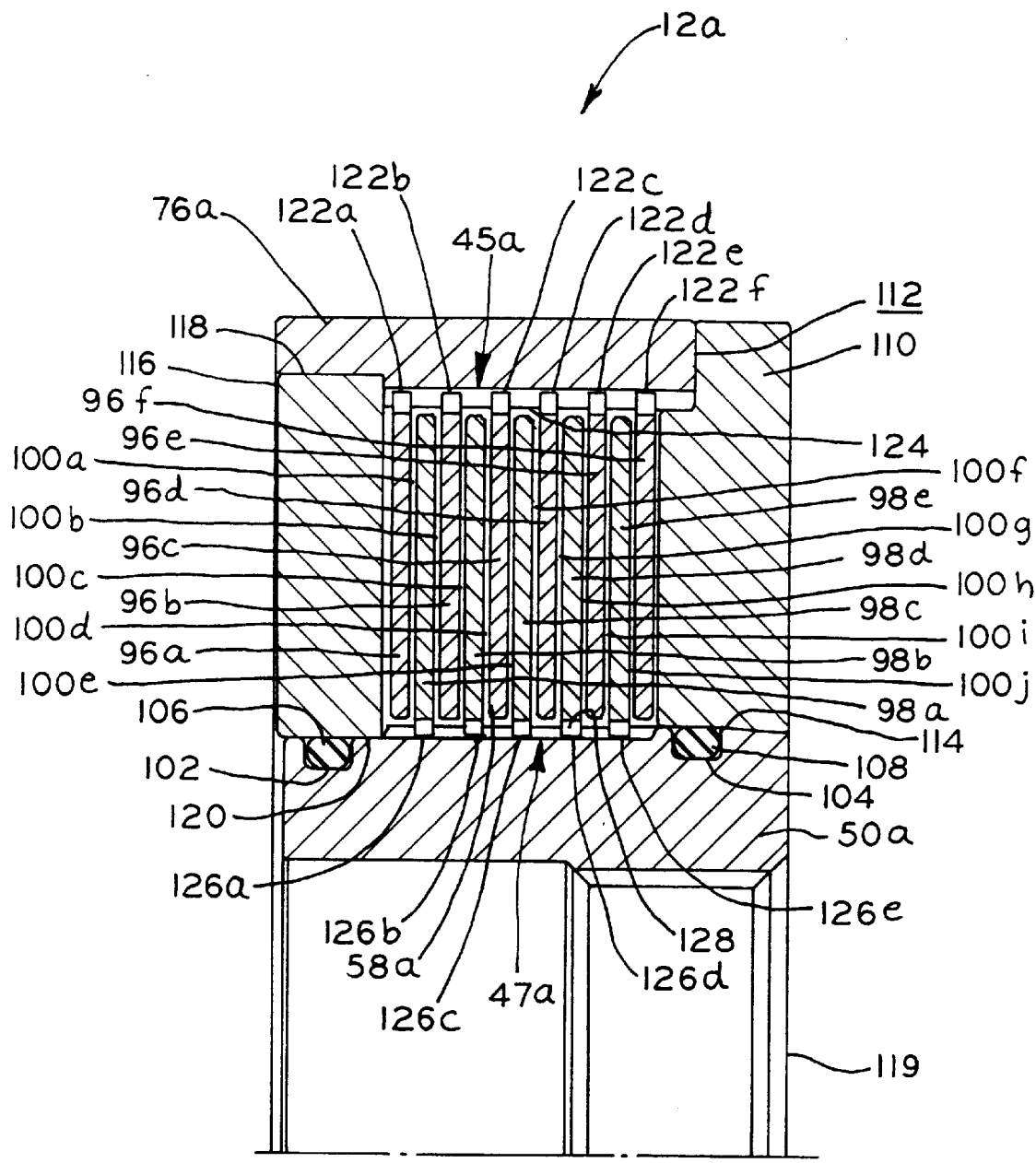
FIG. 10 is an enlarged, partial sectional view of the brake assembly of the differential of FIG. 9, showing the annular disk brake elements of the magnetorheological fluid brake assembly.

Referring to FIGS. 9 and 10, brake assembly 12a includes annular chamber 58a defined by first and second backing plates 110, 116 respectively, output hub 50a and annular insert 76a. Output hub 50a is splined to first axle shaft 18 and includes a pair of O-ring grooves 102, 104 provided in outer surface 128 of output hub 50a. A pair of O-rings 106, 108 fit within respective O-ring grooves 102, 104 to seal MR fluid within annular chamber 58a. First backing plate 110 includes face 112 which is sealably joined to annular insert 76a (FIG. 10). Inner cylindrical surface 114 of first backing plate 110 engages seal 108 to effectuate a dynamic seal between output hub 50a and first backing plate 110. Second backing plate 116 includes peripheral surface 118 sealably joined to annular insert 76a and inner cylindrical surface 120 which engages seal 106 to effectuate a dynamic seal between output hub 50a and second backing plate 116. Output hub 50a includes axial end 119 which abuts first side gear 22.

Disks 96a–96f are splined to annular insert 76a within respective grooves 122a–122f, provided in inner surface 124 of annular insert 76a. Similarly, disks 98a–98e are splined to output hub 50a within respective grooves 126a–126e, provided in outer surface 128 of output hub 50a. First and second backing plates 110, 116 are made from a low carbon steel and annular insert 76a and output hub 50a are constructed from a non-magnetic material such as, for example a 300 series stainless steel or aluminum to direct magnetic flux 44a axially through respective disks 96a–96f and 98a–98e (FIG. 9).

FIGS. 11 and 12 illustrate the operation of braking assembly 12a. Disk 98b (FIG. 11) includes surface 130 overlaying surface 132 of disk 96b (FIG. 12). Disk 98b has an inner surface portion splined to output hub 50a, and disk 96b has an outer periphery splined to annular insert 76a. Annular gap 134 (FIG. 11) provides radial clearance to allow free rotation of disk 98b relative to annular insert 76a. Similarly, annular gap 136 (FIG. 12) provides radial clearance to allow free rotation of disk 96b relative to output hub 50a. In operation, surfaces 130 of disks 98 are adjacent and closely overlaid with surfaces 132 of disks 96, set apart by gaps 100a–j (FIG. 10). Gaps 100 are substantially occupied by a quantity of MR fluid. In the presence of magnetic flux 44a, disks 96 binds with disks 98, to effectuate torque transfer therebetween. Surfaces 130, 132 may include shear load support features such as raised portions, indents, slots or holes therethrough to enhance shear load support of the MR fluid interface with surfaces 130 and 132.

When magnetic flux 44a is removed or deactivated, the MR fluid offers an insignificant resistance to shear, for example that of a lubrication oil, between disks 96 and 98. Conversely, in the presence of magnetic flux 44a, MR fluid solidification provides a substantial resistance to shear between the disks, until at which point the disks operate as one rigidly coupled unit. The remaining pairs of alternatively arranged disks provide a substantially equivalent torque transfer as that achieved by disks 96 engaging with disks 98, through solidified MR fluid. Each disk 96a–96f and 98a–98e is made from a low carbon steel or other like material which allows suitable conduction of a magnet flux therethrough.

Figure 13:
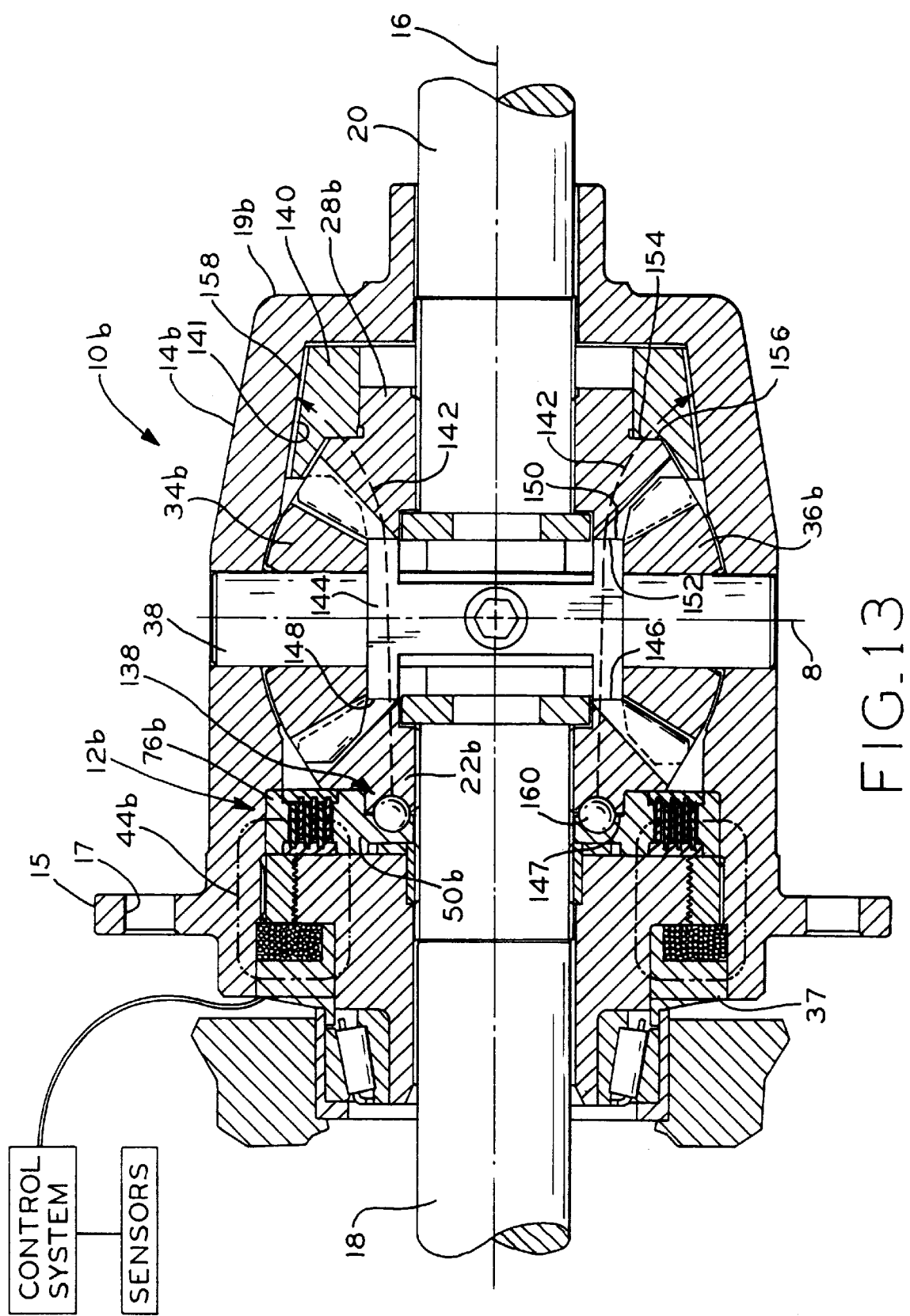
FIG. 13 is a sectional view of a third embodiment of a controllable differential according to the present invention.

FIG. 13 shows a third embodiment of the invention. MR fluid differential 10b differs from the first embodiment differential 10 (FIG. 1) in several aspects, such as including modified brake assembly 12b which activates ball ramp assembly 138 and engagement of cone clutch element 140, axially and rotatably fixed to side gear 28b, with casing 14b. The ball ramp assembly and corresponding engagement of cone clutch element is the subject of U.S. Pat. No. 5,989,147 (Forrest), assigned to the assignee of the present invention, the disclosure of which is expressly incorporated herein by reference.

Figure 14:
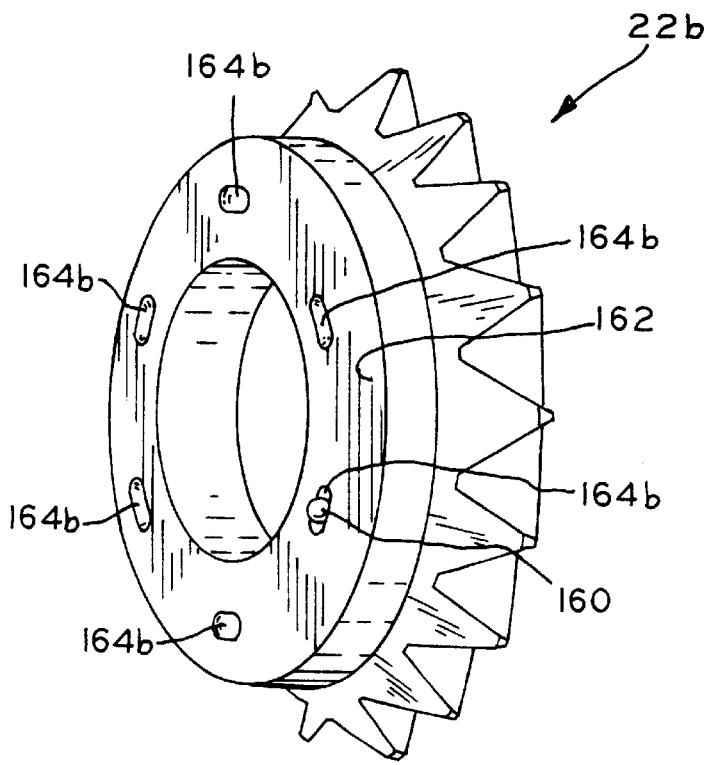
FIG. 14 is a perspective view of a side gear of the differentials shown in FIGS. 13 and 17, showing the ball ramp slots and one of a plurality of ball bearings.
Figure 15:
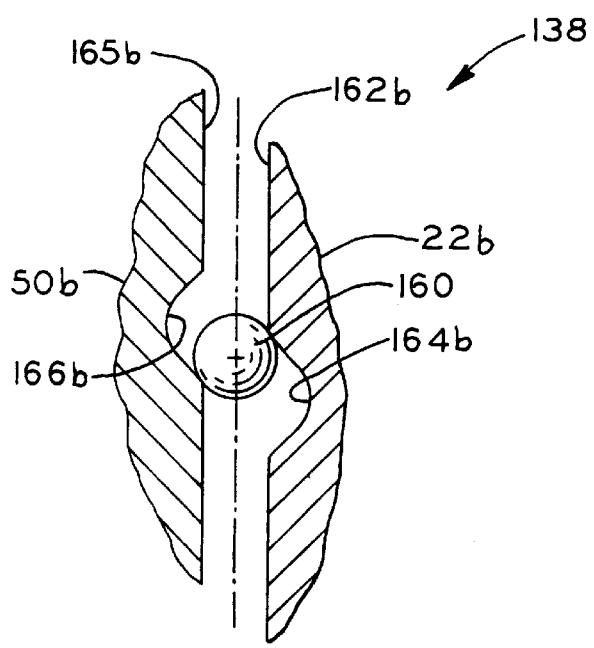
FIG. 15 is a schematic representation of the ball ramp assemblies of the differentials of FIGS. 13 and 17.
Figure 16:
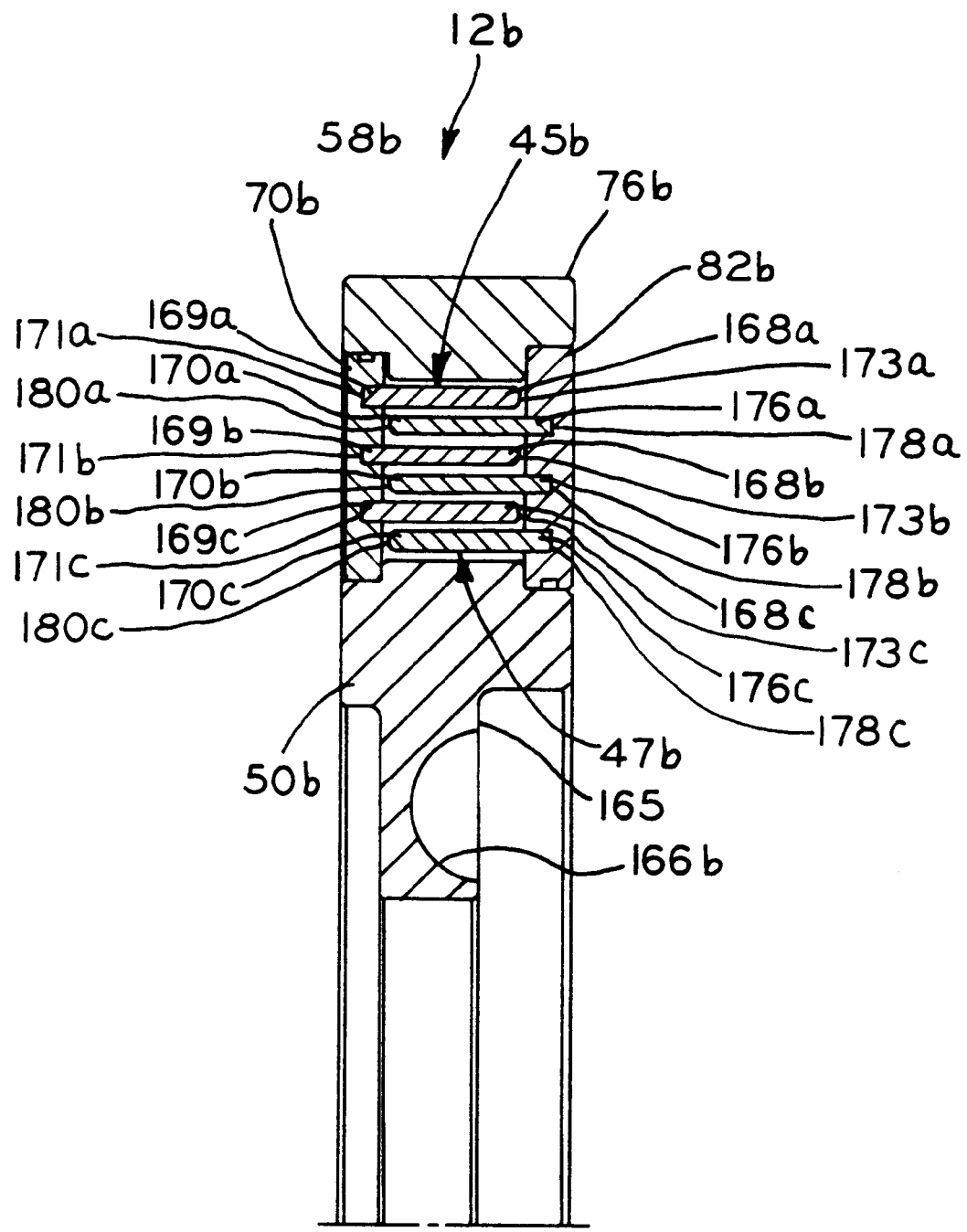
FIG. 16 is an enlarged view of the brake assembly of the differential of FIG. 13, showing its cylindrical brake elements.

FIGS. 14 and 15 show ball ramp assembly 138b including first side gear 22b, output hub 50b and a plurality of circumferentially arranged ball bearings 160 therebetween. First side gear 22b includes face 162b having a plurality of oval shaped and circumferentially distributed ball ramp slots 164b. Similarly, output hub 50b includes face 165b having a plurality of ball ramp slots 166b which are similar in characteristics and placement respective of first side gear 22b (FIG. 16). A ball 160 is disposed in each interfacing pair of slots 164b and 166b. Each ball ramp slot 164b and 166b is defined by suitably sloping and arcuate walls to provide gradual and increasing axial separation of first side gear 22b respective of the output hub 50b, initiated by relative rotation between first side gear 22b and output hub 50b (FIG. 15). In the exemplary embodiment, three or more ball ramp slots 164b, 166b, within respective first side gear 22b and output hub 50b, provide a suitable distribution of force to properly displace first side gear 22b toward cone clutch element 140.

In operation, brake assembly 12b initiates relative rotation between the first side gear 22b and output hub 50b to axially displace first side gear 22b. Ball ramp assembly 138b creates force along paths 142 to urge cone clutch element 140 into engagement with casing 14b, as shown in FIG. 13. Frustoconical surfaces 141 and 158 are thereby engaged and torque is transferred from casing 14b to axle shafts 18 and 20 through side gears 22b, 28b which are splined to axle shafts 18 and 20, respectively, and transfer block 144 located between the side gears.

First side gear 22b includes face 162b which abuts face 165b of output hub 50b when slots 164b (FIGS. 14 and 15) of first side gear 22b are circumferentially aligned with its mating slot 166b within output hub 50b (FIGS. 13 and 15). As best seen in FIG. 13, end surface 146, provided on an axial end of first side gear 22b, abuts surface 148 of transfer block 144. Transfer block 144 is disposed about cross pin 38 and adapted to move laterally relative thereto along axis 16 (FIG. 13). The shown transfer block is the subject of pending U.S. patent application Ser. No. 09/447,410, filed Nov. 23, 1999, assigned to the assignee of the present invention, the disclosure of which is expressly incorporated herein by reference. First side gear 22b includes end surface 146 which is in sliding engagement with surface 148 of transfer block 144, and axial movement of side gear 22b away from output hub 50b forces transfer block 144 toward second axle shaft 20. Surface 150 of transfer block 144, faces second side gear 28b and is in sliding engagement with surface 152 of second side gear 28b and axial movement of transfer block 144 away from output hub 50b forces cone clutch element 140, rotatably and axially fixed to side gear 28b, into frictional engagement with rotatable casing 14, thereby coupling axle 20 to the casing.

FIG. 16 shows brake assembly 12b which includes alternating cylindrical brake elements to provide actuation of cone clutch 140 within limited slip differential 10b. Similar to the operation of first and second brake element sets 45, 47 of MR fluid differential 10, as shown in FIG. 1, first and second brake element sets 45b, 47b include cylindrical elements which are alternating and coaxially overlaid. Brake assembly 12b includes annular chamber 58b defined by first and second backing plates 70b, 82b, output hub 50b and annular insert 76b. First backing plate 70b is fixedly attached to output hub 50b. Referring to FIG. 16, first set 45b of cylindrical brake elements 168a–168c include first ends 169a–169c respectively fitted into grooves 171a–171c provided in backing plate 70b. Elements 168a–168c extend axially from first backing plate 70b toward second backing plate 82b. A clearance is provided between second ends 173a–173c of respective cylindrical elements 168a–168c and second backing plate 182b. Annular insert 76b is attached to casing 14b (FIG. 13), and has second backing plate 82b fixed thereto. Second set 47b of cylindrical brake elements 170a–170c include first ends 176a–176c respectively fitted into grooves 178a–178c provided in backing plate 82b. First and second sets of brake element first ends 169a–169c and 176a–176c are fixed within their respective grooves 171 a–171c and 178a–178c by, for example, a press fit. Elements 176a–176c extend axially from second backing plate 82b toward first backing plate 70b. A clearance is provided between second ends 180a–180c of respective cylindrical brake elements 170a–170c and first backing plate 70b. First set of cylindrical brake elements 168a–168c respectively superpose second set of brake elements 170a–170c.

Referring to FIG. 13, in operation, an amount of torque is transferred from output hub 50b to first side gear 22b, through bearings 160, when brake assembly 12b is subjected to magnetic flux 44b. Magnetic flux 44b, provided by coil 37, causes the MR fluid to at least partially solidify, which binds first and second sets 45b, 47b of cylindrical brake elements together. Additional torque is transferred from casing 14b to first and second axle shafts 18, 20 through cone clutch element 140 engaged with inner surface 141 of casing 14b. Specifically, cone clutch element 140 is driven rightward by side gear 22b though transfer block 144; surface 158 is frictionally engaged with surface 141 of casing 14b to transfer the additional torque from casing 14b to axles 18 and 20. In contrast to the first embodiment MR differential 10, as shown in FIG. 1, differential 10b includes less cylindrical elements having a smaller braking area since brake assembly 12b transfers only a portion of the torque while cone clutch element 140 provides the primary torque transfer between the differential casing and the axles.

Figure 17:
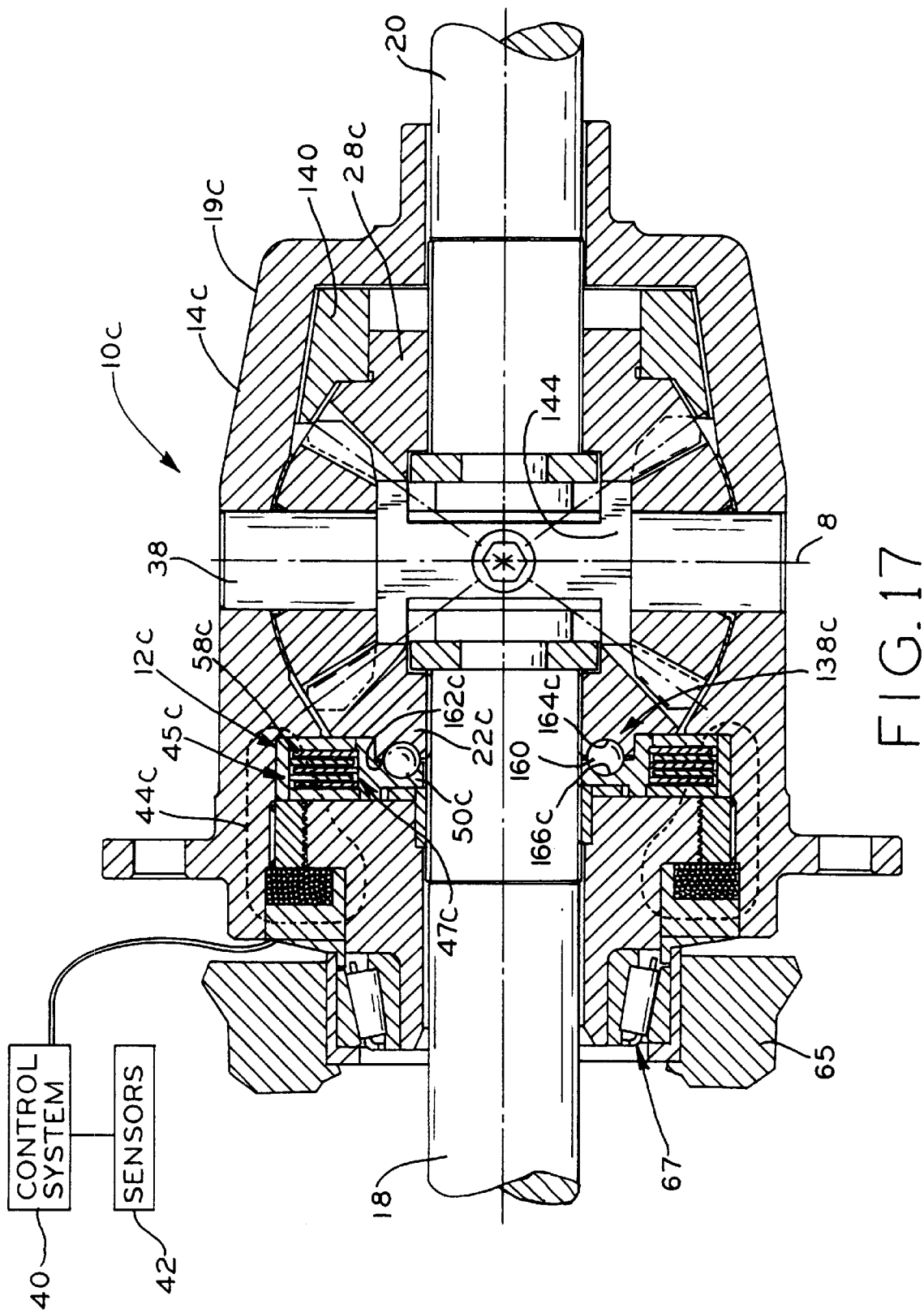
FIG. 17 is a sectional view of a fourth embodiment of a controllable differential according to the present invention.
Figure 18:
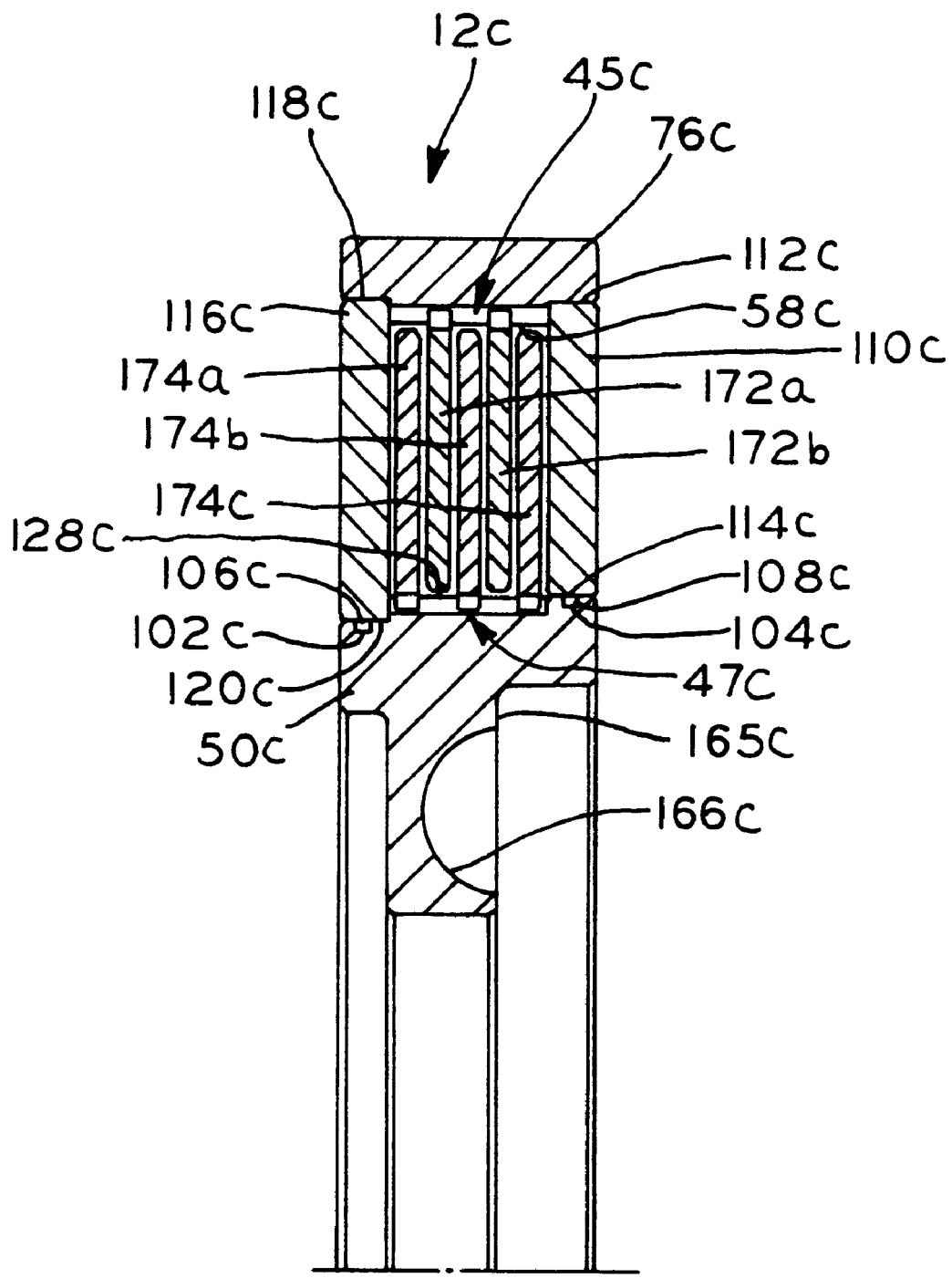
FIG. 18 is an enlarged view of the brake assembly of the differential of FIG. 17, showing its disk brake elements.
Figure 19:
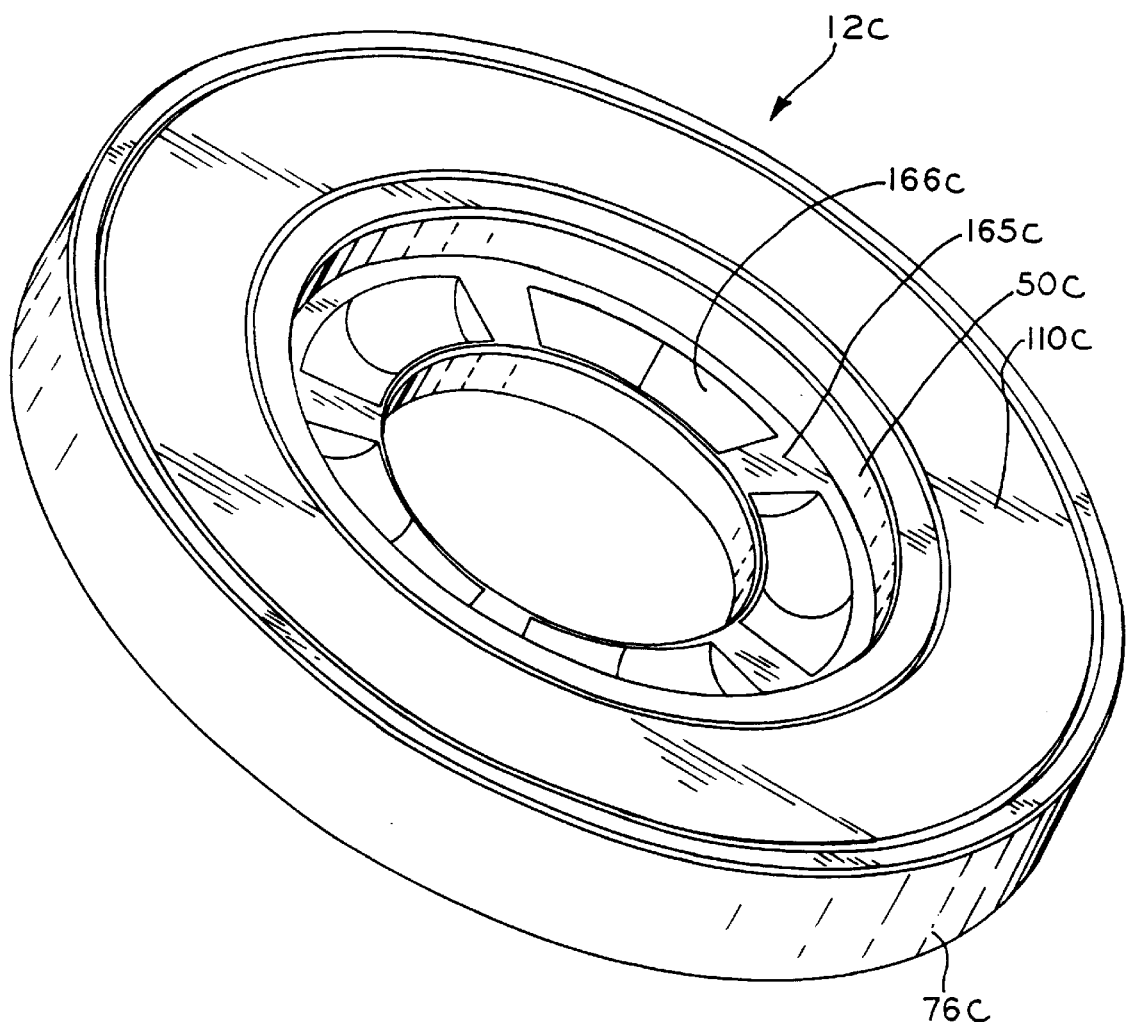
FIG. 19 is a perspective view of the brake assembly of the differential of FIG. 17, showing the ball ramp slots provided in its output hub.
Figure 20:
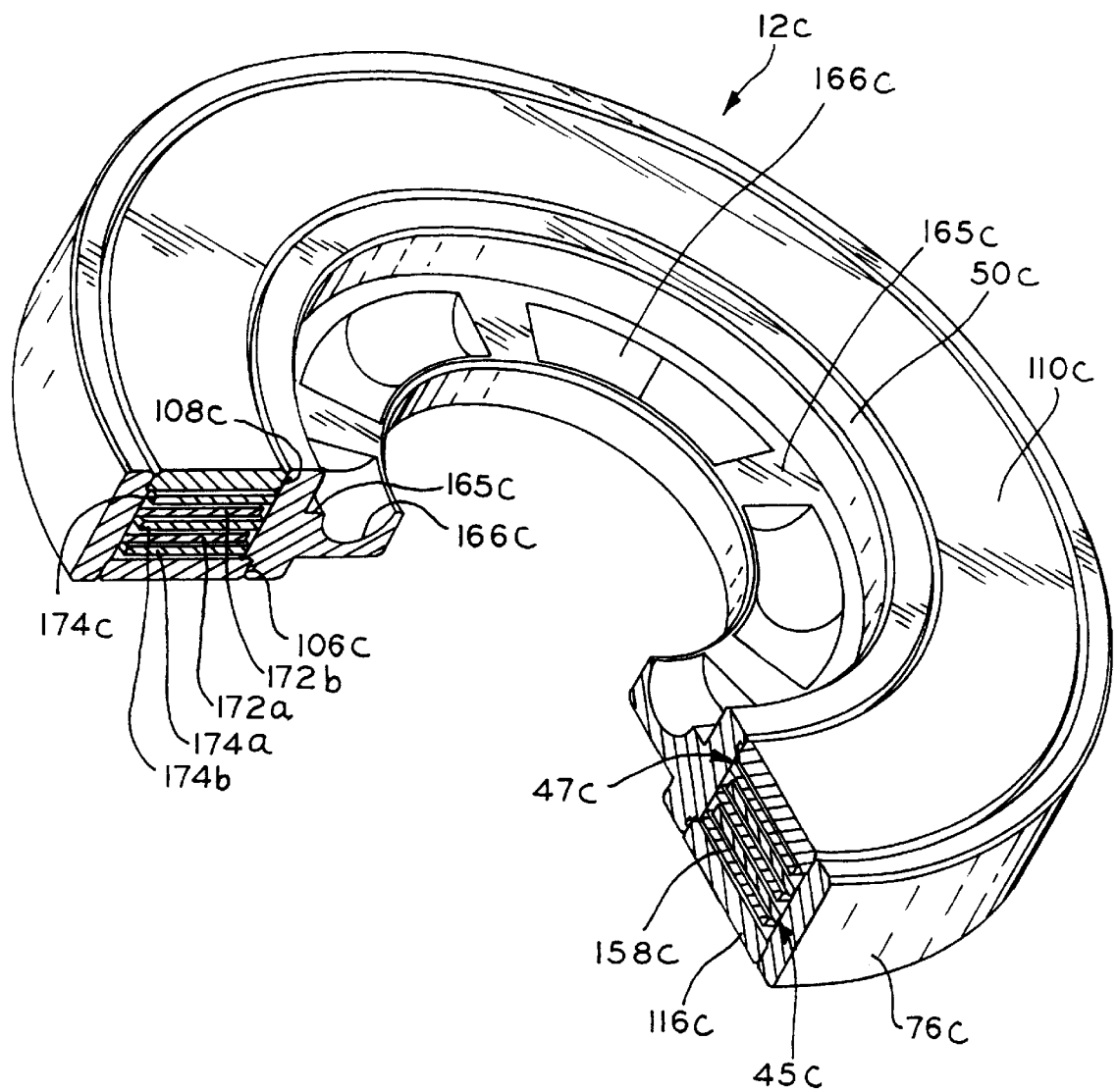
FIG. 20 is a sectional view of the brake assembly of FIG. 19, showing its disk brake elements.

FIG. 17 shows a fourth embodiment of the invention. MR fluid limited slip differential 10c differs from the third embodiment differential 10b, by including modified brake assembly 12c (FIGS. 17–24). Referring to FIGS. 18 and 20, brake assembly 12c includes annular chamber 58c defined by first and second backing plates 110c, 116c respectively, output hub 50c and annular insert 76c. Output hub 50c includes a pair of O-ring grooves 102c, 104c provided in outer periphery 128c of output hub 50c. A pair of O-rings 106c, 108c fit within respective O-ring grooves 102c, 104c to seal MR fluid within annular chamber 58c. First backing plate 110c includes outer cylindrical surface 112c sealably joined to annular insert 76c and inner cylindrical surface 114c slidably engaged with seal 108c to provide a dynamic seal. Second backing plate 116c includes outer periphery 118c sealably joined to annular insert 76c. Inner cylindrical surface 120c of second backing plate 116c engages O-ring 106c to effectuate a dynamic seal between output hub 50a and second backing plate 116c.

Referring to FIG. 17, ball ramp assembly 138c includes first side gear 22c which may be axially separated from output hub 50c through ball bearings 160, and effectuates an axial force on cone clutch element 140c through transfer block 144, as described above with respect to third embodiment differential 10b (FIG. 13). Specifically and with reference to FIG. 17, ball ramp assembly 138c includes first side gear 22c, output hub 50c and a plurality of radially arranged ball bearings 160 disposed therebetween. First side gear 22c includes face 162c having a plurality of oval-shaped and circumferentially distributed ball ramp slots 164c. Similarly, output hub 50c includes face 165c having a plurality of ball ramp slots 166c which are similar in characteristics and placement to slots 164c. Each ball ramp slot 164c, 166c is defined by suitably sloping and arcuate walls to provide gradual and increasing axial separation of first side gear 22c from output hub 50c by balls 160 in response to relative rotation between first side gear 22c and output hub 50c.

Figure 23:
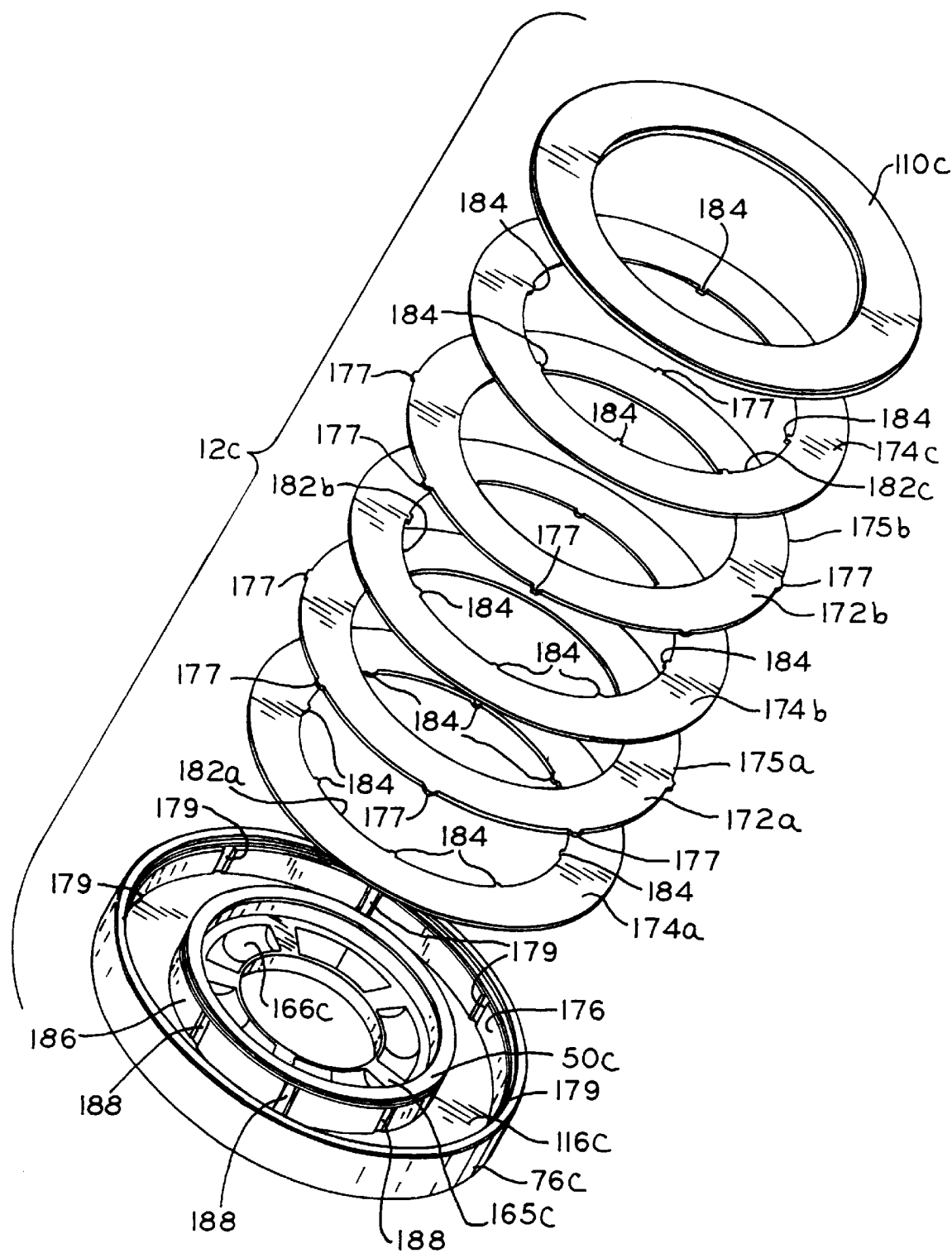
FIG. 23 is another exploded view of the brake assembly of FIG. 19.
Figure 24:
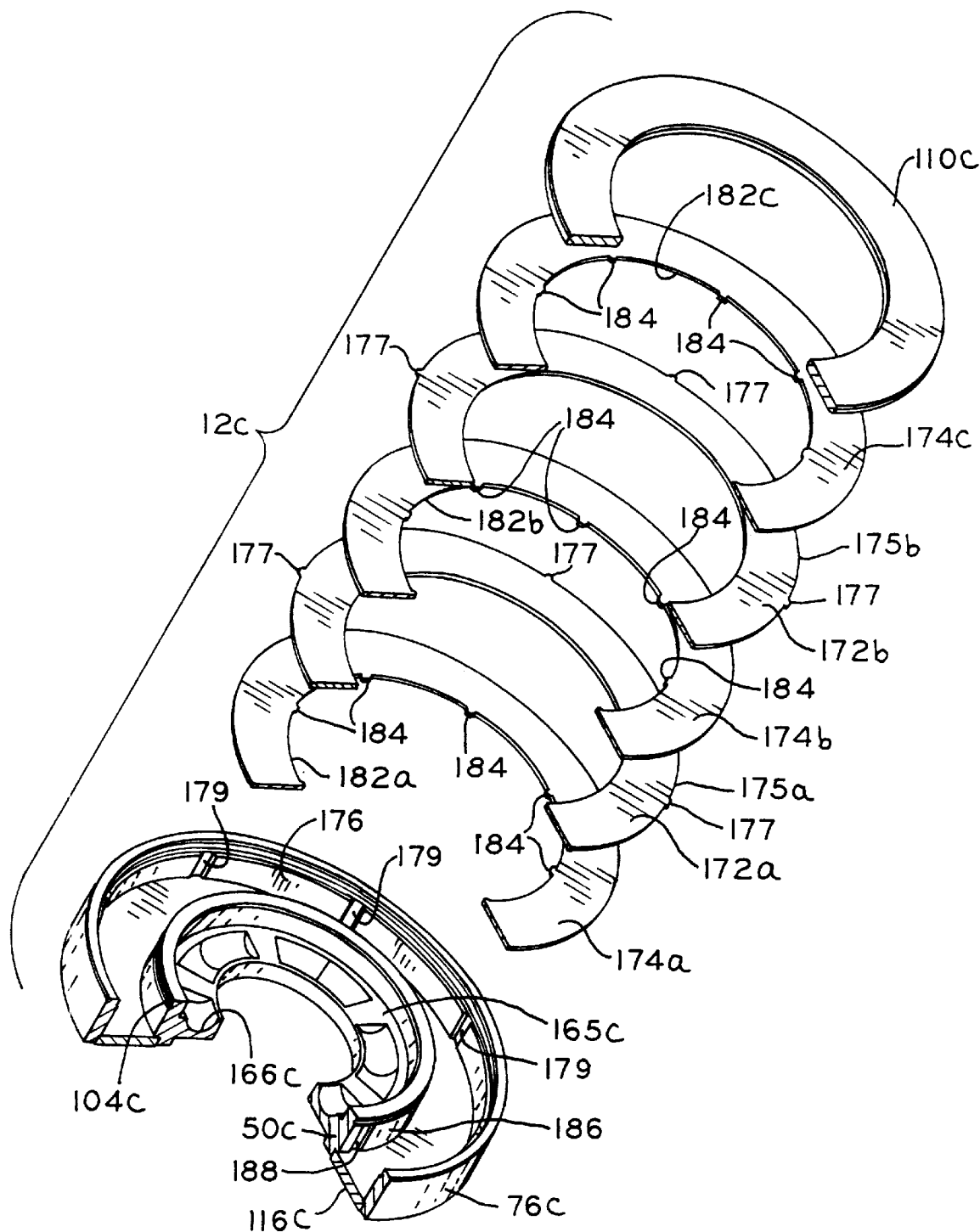
FIG. 24 is a sectional view of the brake assembly of FIG. 23.

Disks 172a and 172b are splined to annular insert 76c and disks 174a–174c are splined to output hub 50c. Disks 172a and 172b respectively include outer peripheral surfaces 175a and 175b and extending radially from each outer peripheral surface 175a and 175b are a plurality of tabs 177 (FIGS. 23 and 24). Tabs 177 may be formed integrally with each disk 172a, 172b and respectively fit into grooves 179 formed in annular insert 76c (FIG. 23). Grooves 179 of annular insert 76c extend axially along inner radial surface 176 of annular insert 76c, and each groove 179 is circumferentially equidistant respective of adjacent grooves 179. Tabs 177 extending from disks 172a–172b may be interference fit within grooves 179 to secure disks 172a–172b to annular insert 76c. Alternatively, tabs 177 may be snugly fitted within grooves 179, and spacers (not shown) provided between each disk 172a–172b to prevent axial movement of disks 172a, 172b. Second backing plates 110c and 116c fit on each end of annular insert 76c to provide a compressive preload to secure plates 172a–172b within annular insert 76c.

Figure 21:
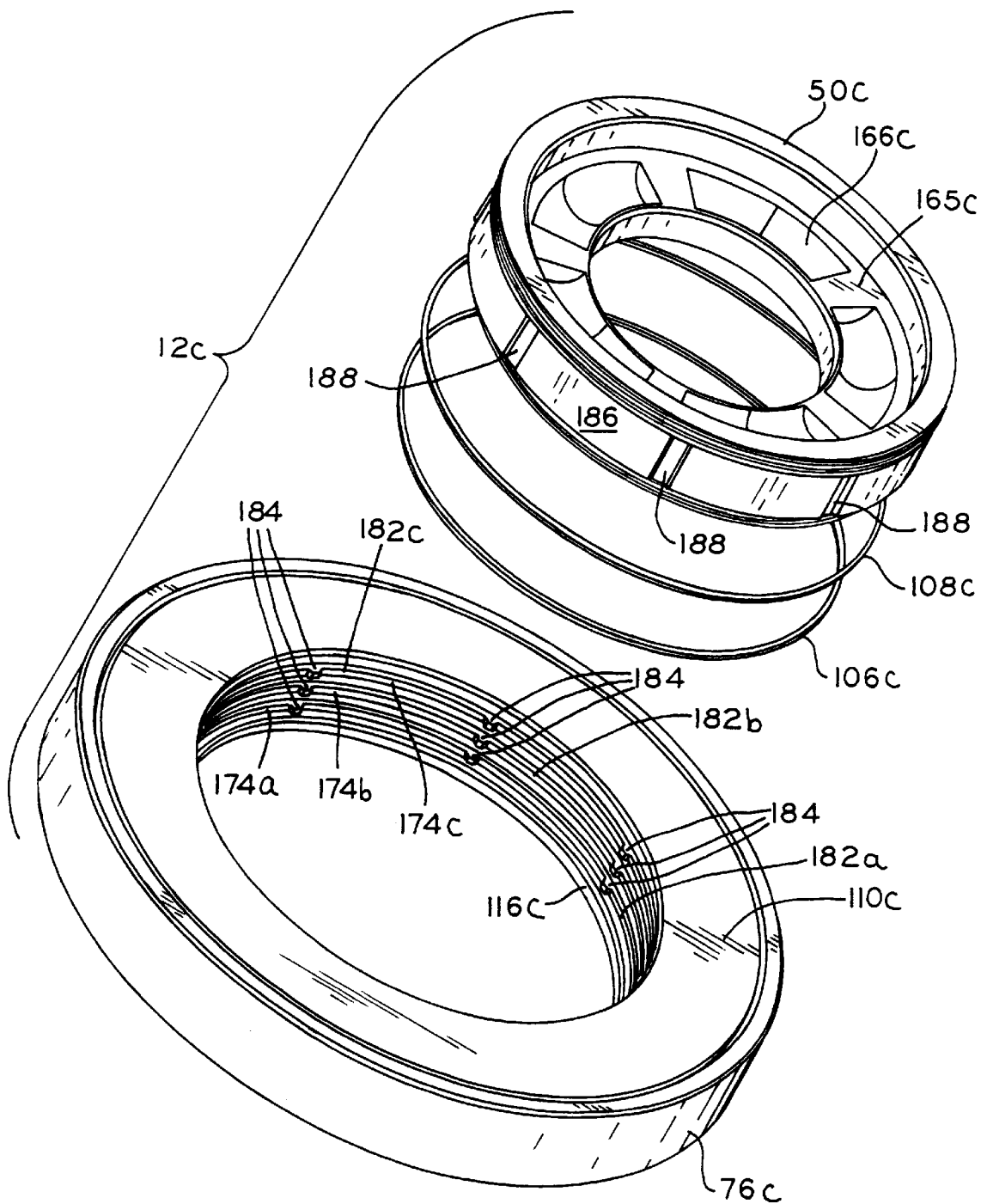
FIG. 21 is an exploded view of the brake assembly of FIG. 19.
Figure 22:
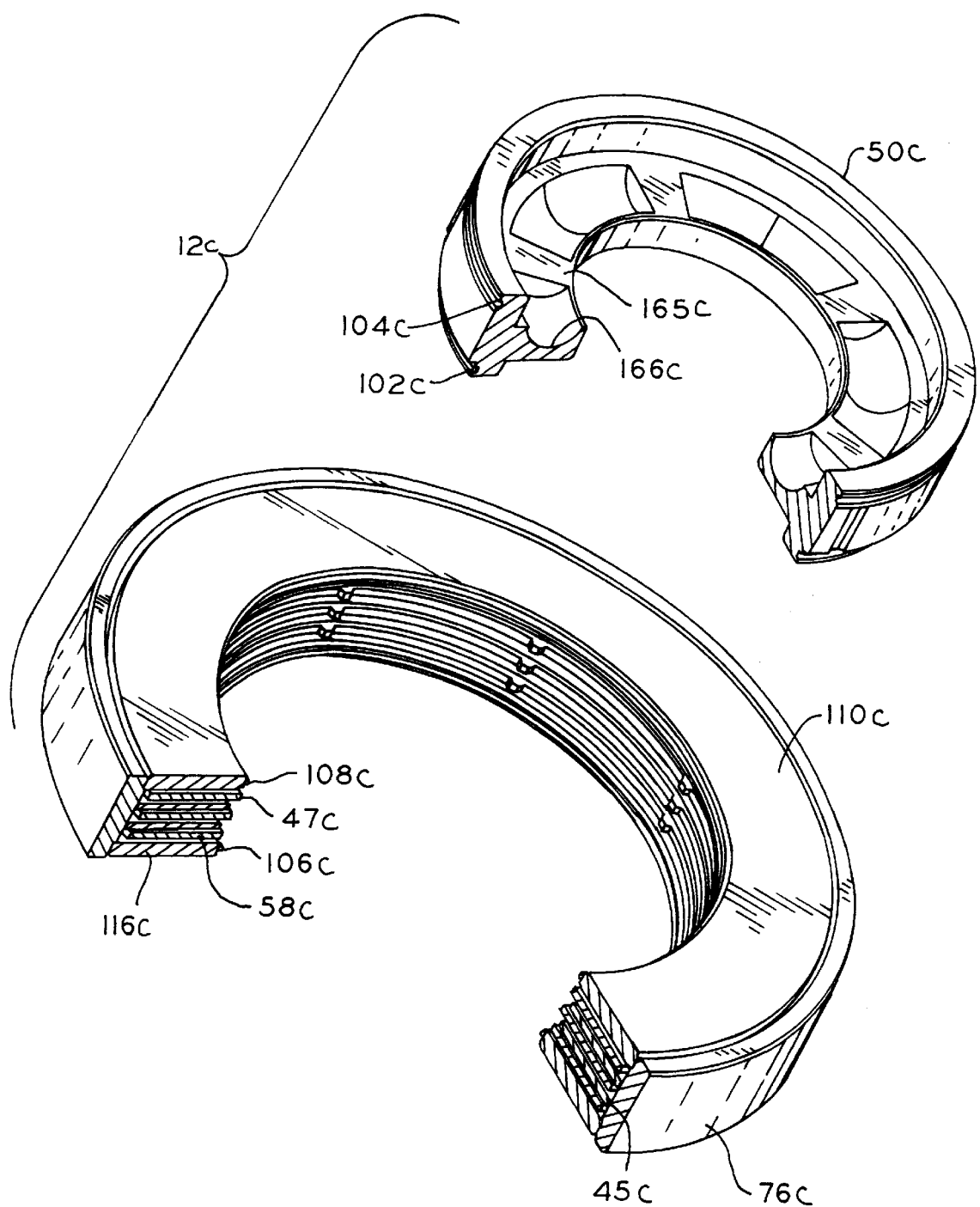
FIG. 22 is a sectional view of the brake assembly of FIG. 21.

Disks 174a–174c respectively have radially inner surfaces 182a–182c each having a plurality of radially inwardly extending tabs 184. Each tab 184 extends into a respective groove 188 formed in outer radial surface 186 of output hub 50c (FIG. 21). Disks 174a–174c are respectively fixed to output hub 50c by tabs 184 being press-fit into grooves 188. Alternatively, each disk 174a–174c may be assembled to output hub 50c by snugly fitting each tab within its respective groove 188 and providing spacers (not shown) between each disk 174a–174c. The disk and spacer stack being secured by first and second backing plates 110c and 116c compressing the spacers and disks within output hub 50c. First and second backing plates 110c, 116c are constructed of a low carbon steel. Annular insert 76c and output hub 50c may be constructed of a non-magnetic material such as, for example, 300 series stainless steel or aluminum to suitably direct magnetic flux 44c axially through respective disks 172a–172b and 174a–174c (FIG. 17).

In contrast to the second embodiment MR differential 10a shown in FIG. 9, MR differential 10c includes fewer disk elements, having a smaller braking area, since brake assembly 12c transfers only a portion of the torque between the casing and the axles, while the cone clutch element provides the primary torque transfer between the casing and the axles.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A limited slip differential comprising:

a rotatable casing;

a pair of axle shafts including respective ends;

a pair of side gears rotatably fixed to said ends of said axle shafts;

at least one pinion gear attached to said casing and meshingly engaged with said pair of side gears;

a brake assembly defining a brake chamber and comprising first and second brake elements disposed within said brake chamber, said first brake element superposed with said second brake element, said first brake element rotatably fixed relative to said casing;

a quantity of magnetorheological fluid disposed within said brake chamber, said first and second brake elements in contact with said magnetorheological fluid; and a selectively energized source of magnetic flux, said magnetorheological fluid being exposed to the flux when said source is energized;

wherein, when said magnetorheological fluid is exposed to the magnetic flux, said magnetorheological fluid is at least partially solidified and said first and second brake elements are coupled to each other through said magnetorheological fluid.

2. The limited slip differential of claim 1, wherein said second brake element rotatably is fixed relative to one of said pair of axle shafts.

3. The limited slip differential of claim 1, wherein said selectively energized source of magnetic flux is a selectively energized source of variable magnetic flux.

4. The limited slip differential of claim 1, further comprising:
- a clutch element rotatably fixed to one of said pair of axle shafts and in releaseable operative engagement with said casing; and
- means for operatively engaging said clutch element and said casing in response to relative rotation between said second brake element and the other of said pair of axle shafts.

5. A limited slip differential comprising:
- a rotating casing;
- first and second side gears disposed within said casing;
- at least one pinion gear disposed within said casing and engaged with said first and second side gears, said pinion gear rotatably attached to said casing;
- a quantity of MR fluid provided between said first side gear and said casing; and
- a magnet from which a magnetic field is issued, said MR fluid being selectively exposed to the magnetic field, said first side gear and said casing being rotatably coupled through said MR fluid when said MR fluid is exposed to the magnetic field, whereby relative rotation between said first and second side gears is controlled.

6. The limited slip differential of claim 5, further comprising a brake assembly having a chamber in which said MR fluid is contained, said brake assembly having relatively rotatable elements in fluid communication with said MR fluid, one of said elements being rotatably coupled at all times to said casing, another of said elements being rotatably coupled at all times to said first side gear.

7. The limited slip differential of claim 6, wherein said brake assembly comprises first and second brake elements having superposed surfaces in fluid contact with said MR fluid.

8. The limited slip differential of claim 7, wherein at least one of said first and second brake element surfaces is provided with shear load support features through which said torque is transferred between said brake element surface and said MR fluid when said MR fluid is exposed to the magnetic field.

9. The limited slip differential of claim 6, wherein said brake assembly comprises first and second pluralities of disk elements in fluid communication with said MR fluid, said first plurality of disk elements rotatably coupled at all times to said casing, said second plurality of disk elements being interleaved with said first plurality of disk elements and rotatably coupled at all times to said first side gear, whereby torque is transferred between said first and second pluralities of disk elements through said MR fluid when said MR fluid is exposed to the magnetic field.

10. The limited slip differential of claim 6, wherein said brake assembly comprises first and second pluralities of substantially cylindrical elements in fluid communication with said MR fluid, said first plurality of substantially cylindrical elements rotatably coupled at all times to said casing, said second plurality of substantially cylindrical elements being interleaved with said first plurality substantially cylindrical elements and rotatably coupled at all times to said first side gear, whereby torque is transferred between said first and second pluralities of substantially cylindrical elements through said MR fluid when said MR fluid is exposed to the magnetic field.

11. The limited slip differential of claim 10, wherein the substantially cylindrical elements of each of said first and second pluralities are substantially concentric.

12. The limited slip differential of claim 5, wherein said magnet is an electromagnet disposed adjacent to said rotating casing, relative rotation existing between said electromagnet and said casing.

13. The limited slip differential of claim 12, wherein energization of said electromagnet is responsive to a sensed condition indicative of relative rotation between said side gears.

14. The limited slip differential of claim 5, wherein the magnetic field to which said MR fluid is exposed is of controllably variable strength, whereby the extent to which said first side gear and said casing are rotatably coupled through said MR fluid is controllable.

15. The limited slip differential of claim 5, wherein said differential further comprises a clutch operatively engaging one of said first and second side gears and said rotating casing, said clutch being selectively engaged in response to said first side gear and said casing being rotatably coupled through said MR fluid when said MR fluid is exposed to the magnetic field.

16. The limited slip differential of claim 15, wherein said first side gear is moved axially in response to being rotatably coupled to said casing through said MR fluid when said MR fluid is exposed to the magnetic field, and said clutch is attached to said second side gear, and further comprising a transfer block disposed between and abutting said first and second side gears, said clutch being frictionally engaged with said casing in response to said axial movement of said first side gear.

17. The limited slip differential of claim 5, further comprising first and second axles rotationally fixed to said first and second side gears, respectively.

18. A limited slip differential comprising:
- a rotating casing;
- at least one pinion gear rotatably attached to said casing;
- first and second axles extending into said casing, said axles being engaged with, and rotatable relative to, each other and to said casing, at least one said axle being rotatably coupled to rotating casing, whereby said at least one axle is driven by said casing; and
- means for selectively increasing the viscosity of a magnetic fluid in operative engagement with a said axle and said casing, and rotatably coupling both said axles to said casing in response to said the viscosity increase, whereby both said axles are driven by said casing.

19. The limited slip differential of claim 18, wherein both said axles are rotatably coupled to said casing through the increased viscosity magnetic fluid.

20. The limited slip differential of claim 19, wherein said first axle is rotatably coupled to said casing through the increased viscosity magnetic fluid, and said second axle is rotatably coupled to said casing through said first axle.

21. The limited slip differential of claim 18, wherein said means includes a clutch, one of said axles and said casing being selectively engaged through said clutch in response to the viscosity increase in said magnetic fluid.

22. A method for operating a limited slip differential, said differential including a first axle, a second axle, a casing, and MR fluid, said method comprising:
- rotating a first axle relative to a rotating casing and a second axle;

applying a magnetic field to the MR fluid, whereby the viscosity of the MR fluid is increased; and rotatably coupling the first and second axles through the rotating casing only by means of the increased viscosity MR fluid, whereby said relative rotation is slowed.

23. The method of claim 22, further comprising engaging a clutch operative between the first axle and the rotating casing.

24. The method of claim 22, wherein said step of applying a magnetic field includes applying a current to an electromagnet.

25. The method of claim 24, wherein the current is of variable magnitude.

* * * * *